Feb. 4, 1964  C. Z. MONROE ETAL  3,120,089
MACHINE FOR FORMING PLASTIC COATED PAPERBOARD CONTAINERS
Filed Nov. 7, 1960  14 Sheets-Sheet 3
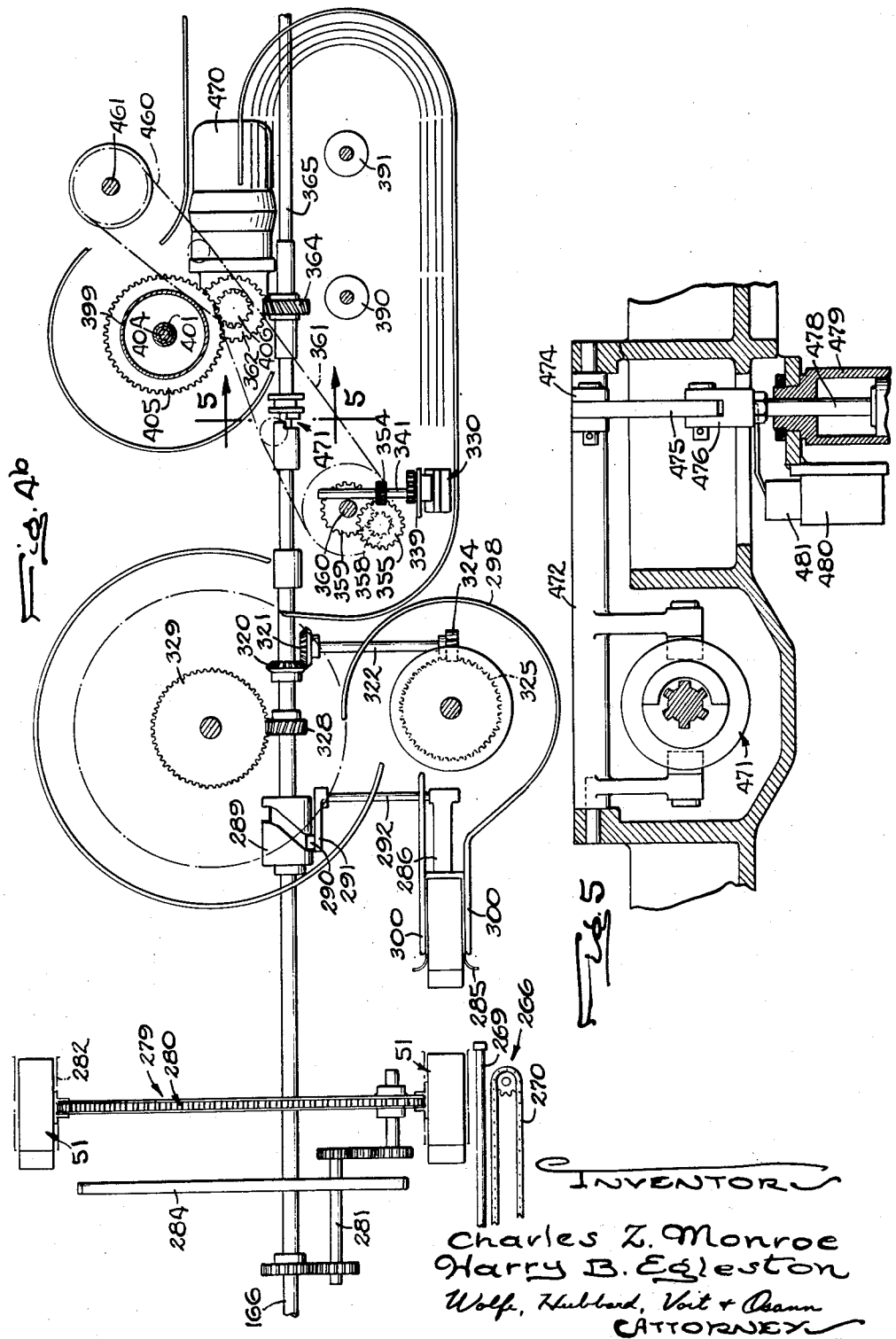
INVENTORS
Charles Z. Monroe
Harry B. Egleston
Wolf, Hubbard, Voit + Osann
ATTORNEYS Feb. 4, 1964    C. Z. MONROE ETAL    3,120,089
MACHINE FOR FORMING PLASTIC COATED PAPERBOARD CONTAINERS
Filed Nov. 7, 1960    14 Sheets-Sheet 4

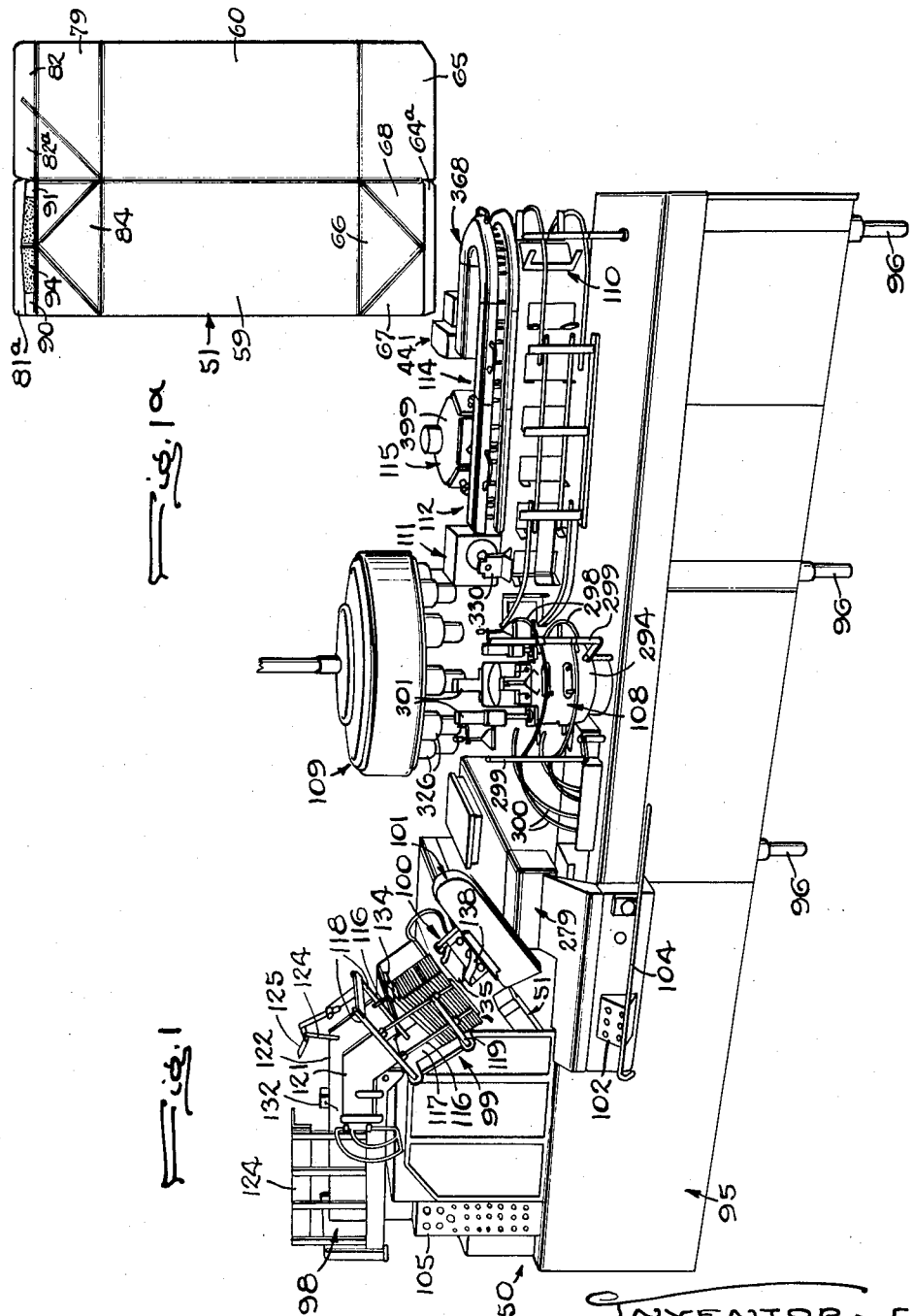

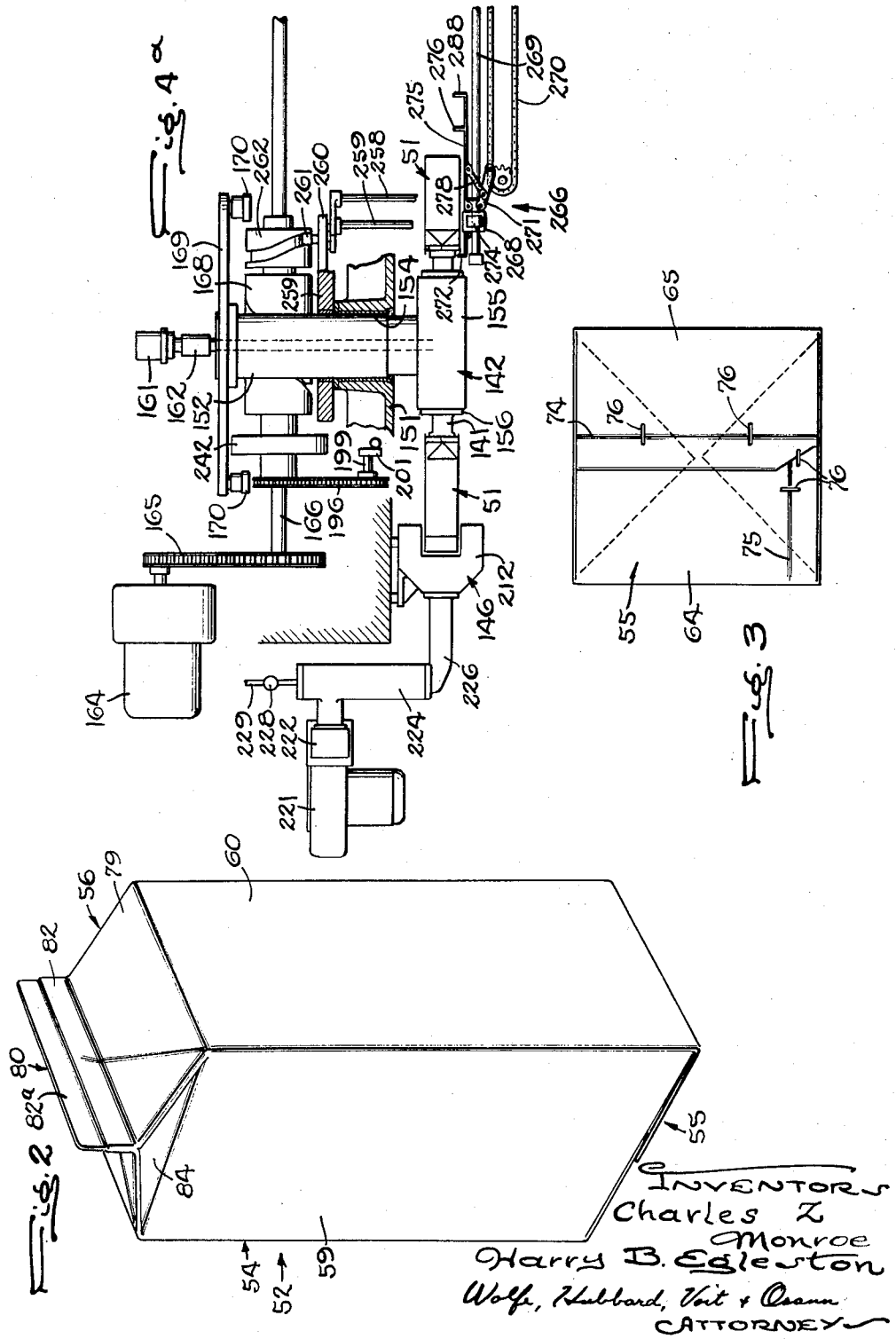

INVENTORS
Charles Z. Monroe
Harry B. Egleston
Wolf, Hubbard, Voit & Osann
ATTORNEYS Feb. 4, 1964     C. Z. MONROE ETAL     3,120,089
MACHINE FOR FORMING PLASTIC COATED PAPERBOARD CONTAINERS
Filed Nov. 7, 1960     14 Sheets-Sheet 5
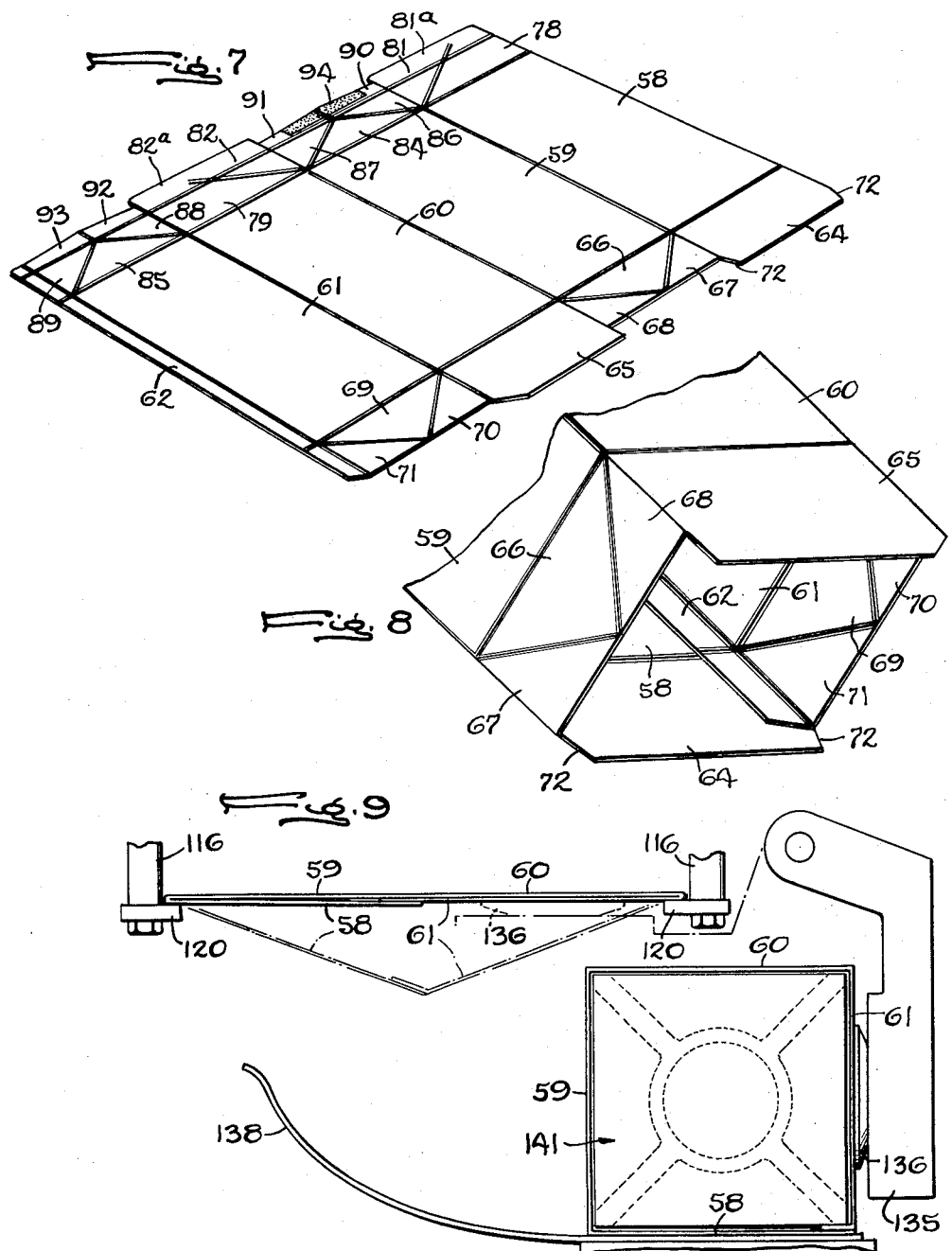

Feb. 4, 1964     C. Z. MONROE ETAL     3,120,089
MACHINE FOR FORMING PLASTIC COATED PAPERBOARD CONTAINERS
Filed Nov. 7, 1960     14 Sheets-Sheet 6
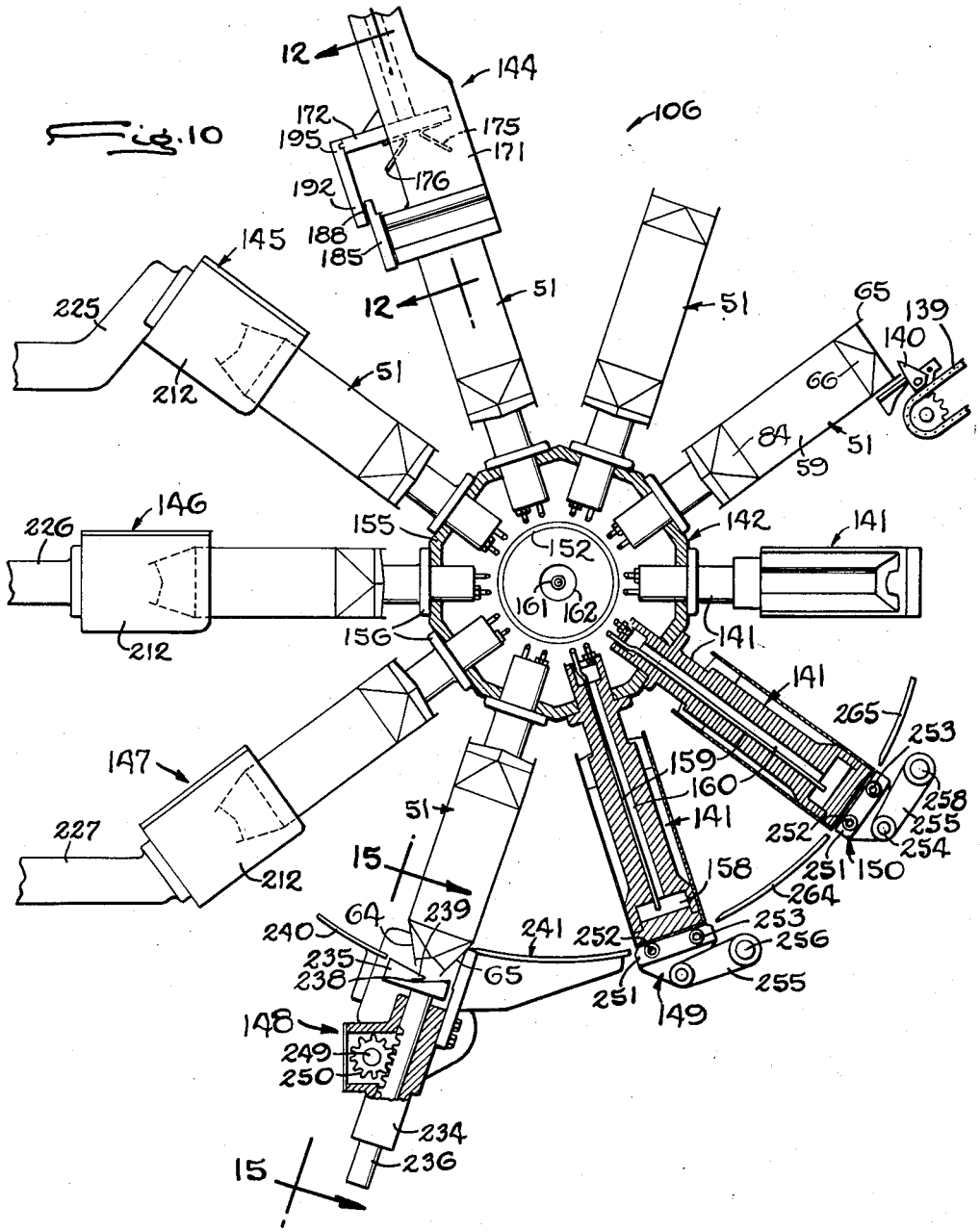
INVENTORS
Charles Z. Monroe
Harry B. Egleston
Wolf, Hubbard, Voit & Osann
ATTORNEYS

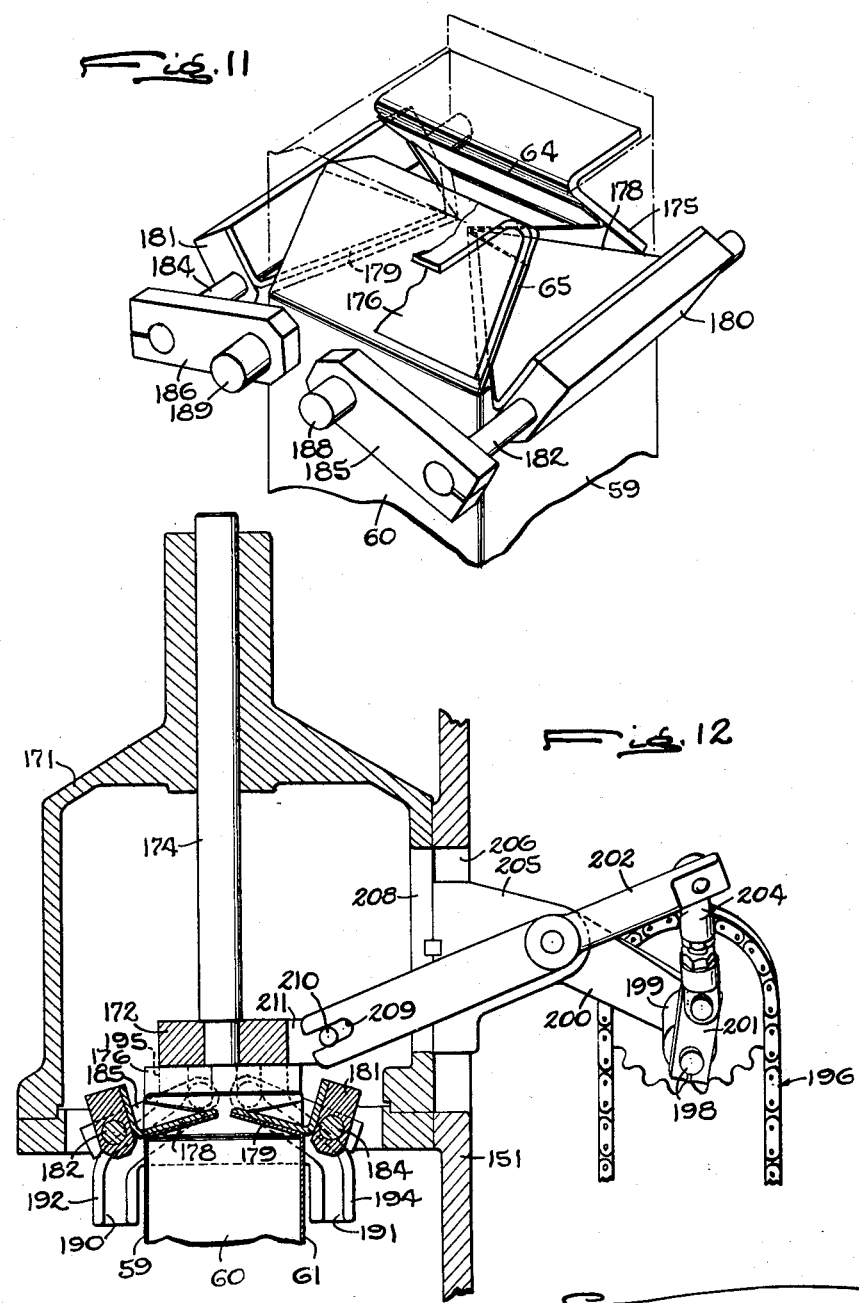

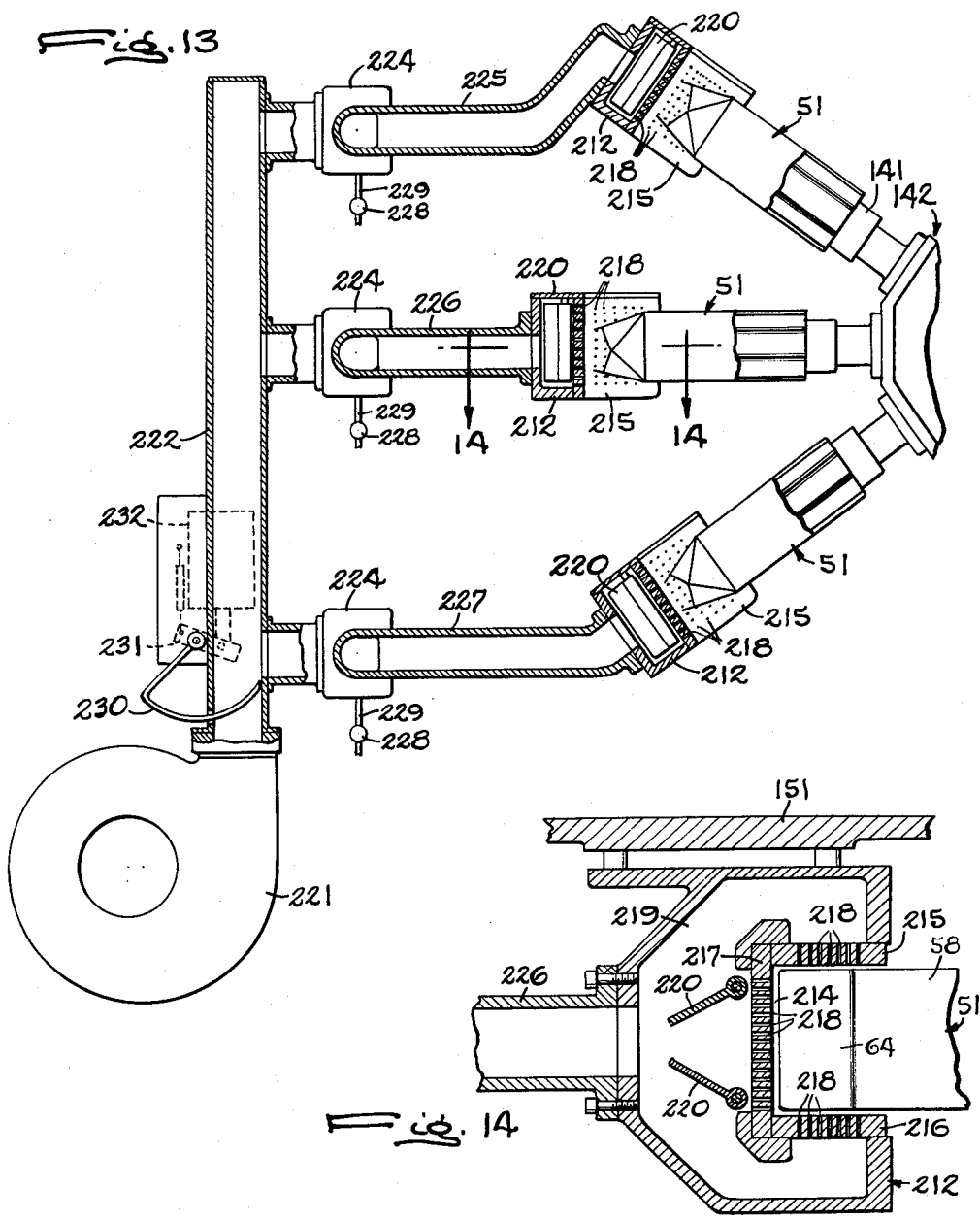

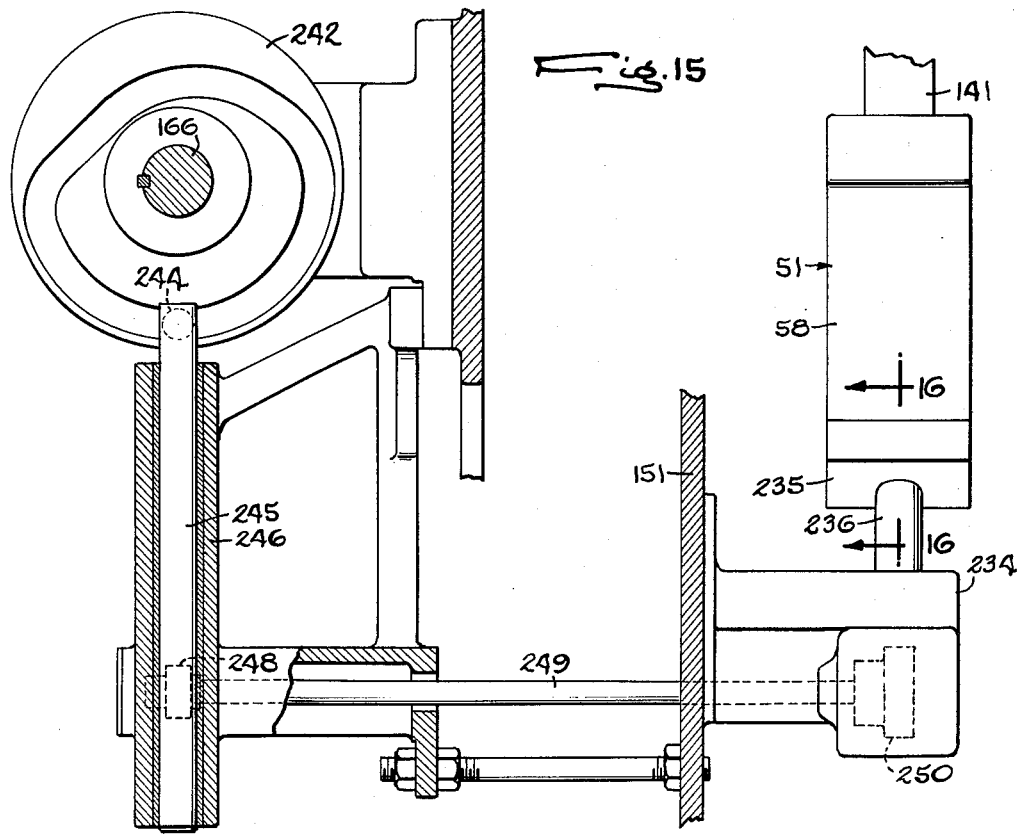
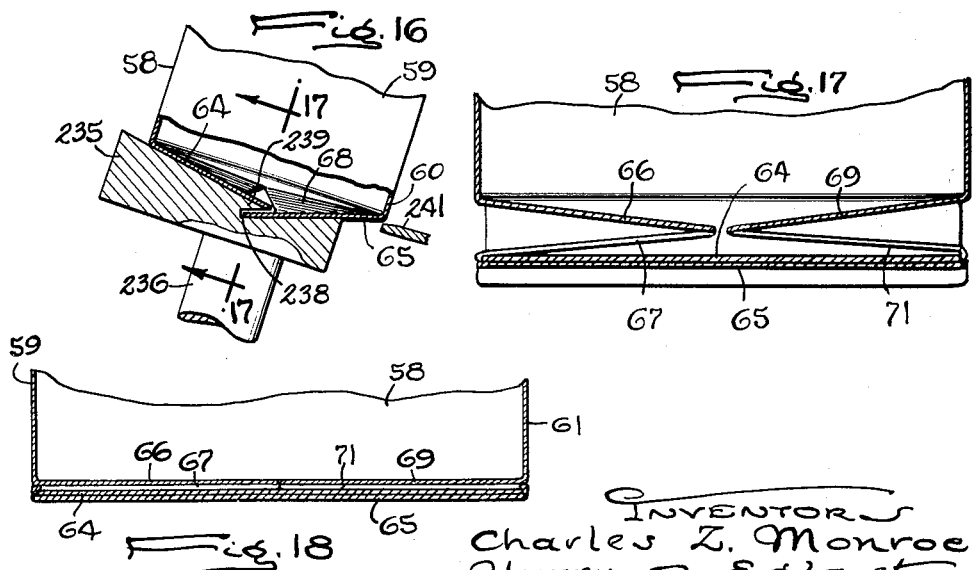

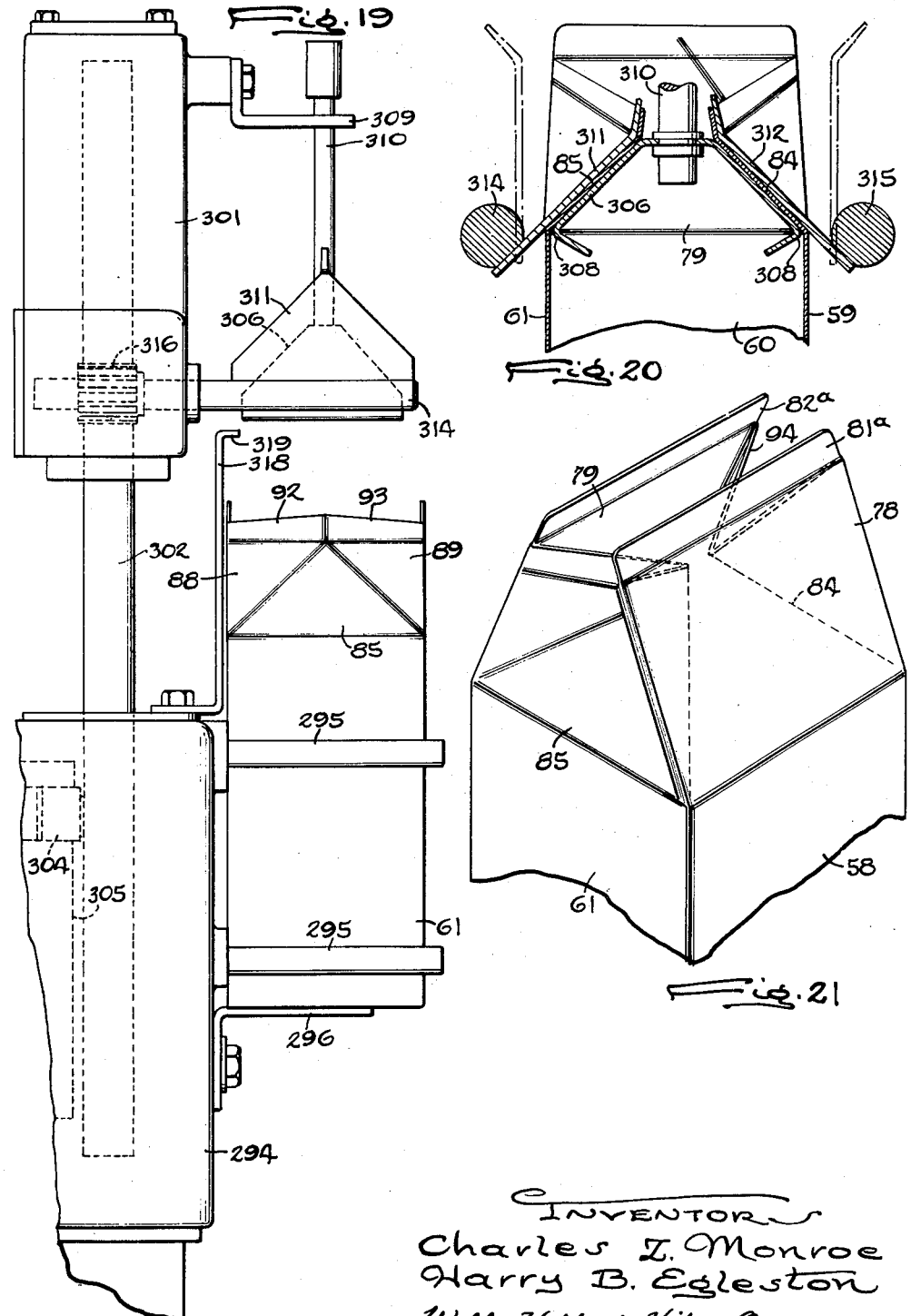

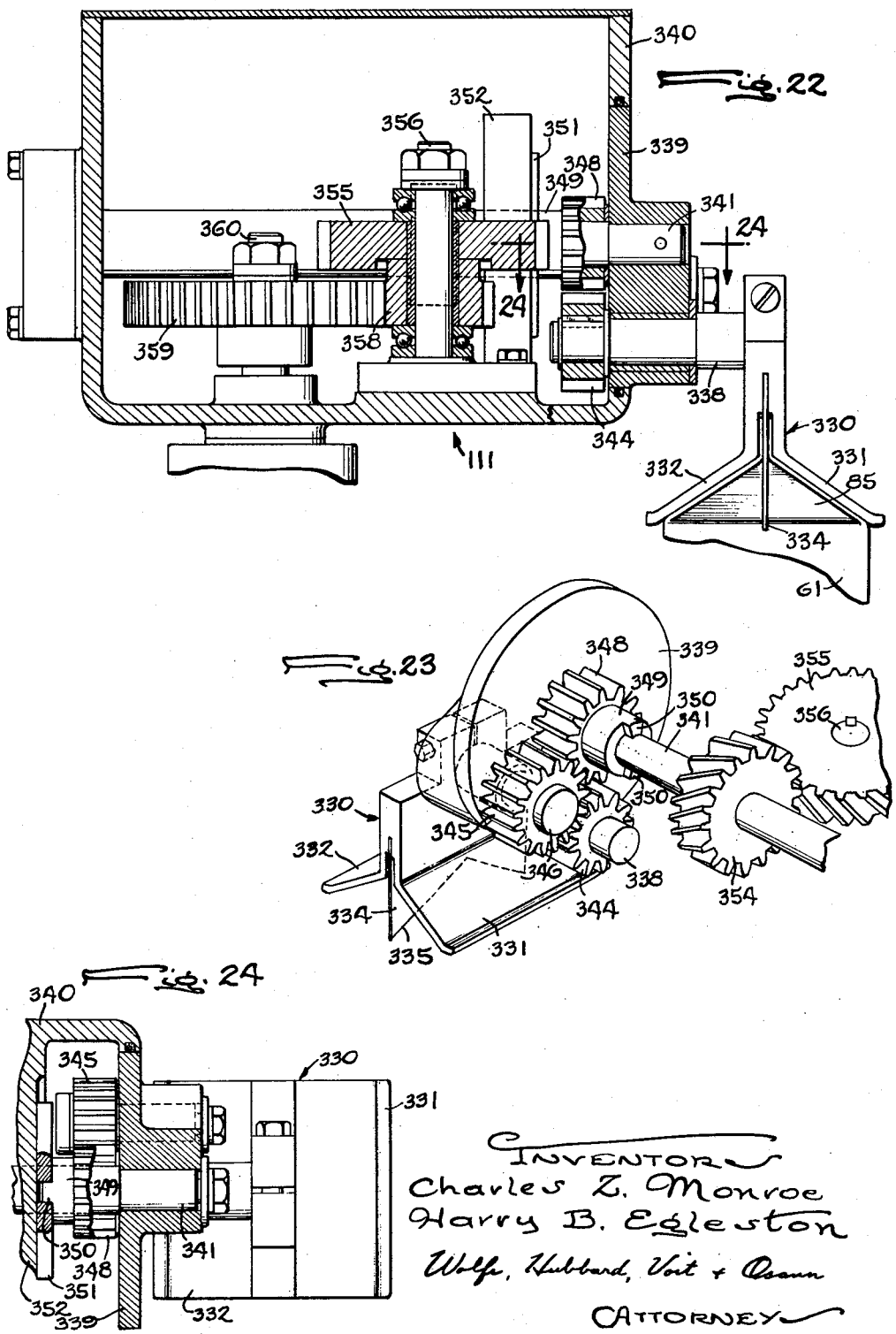

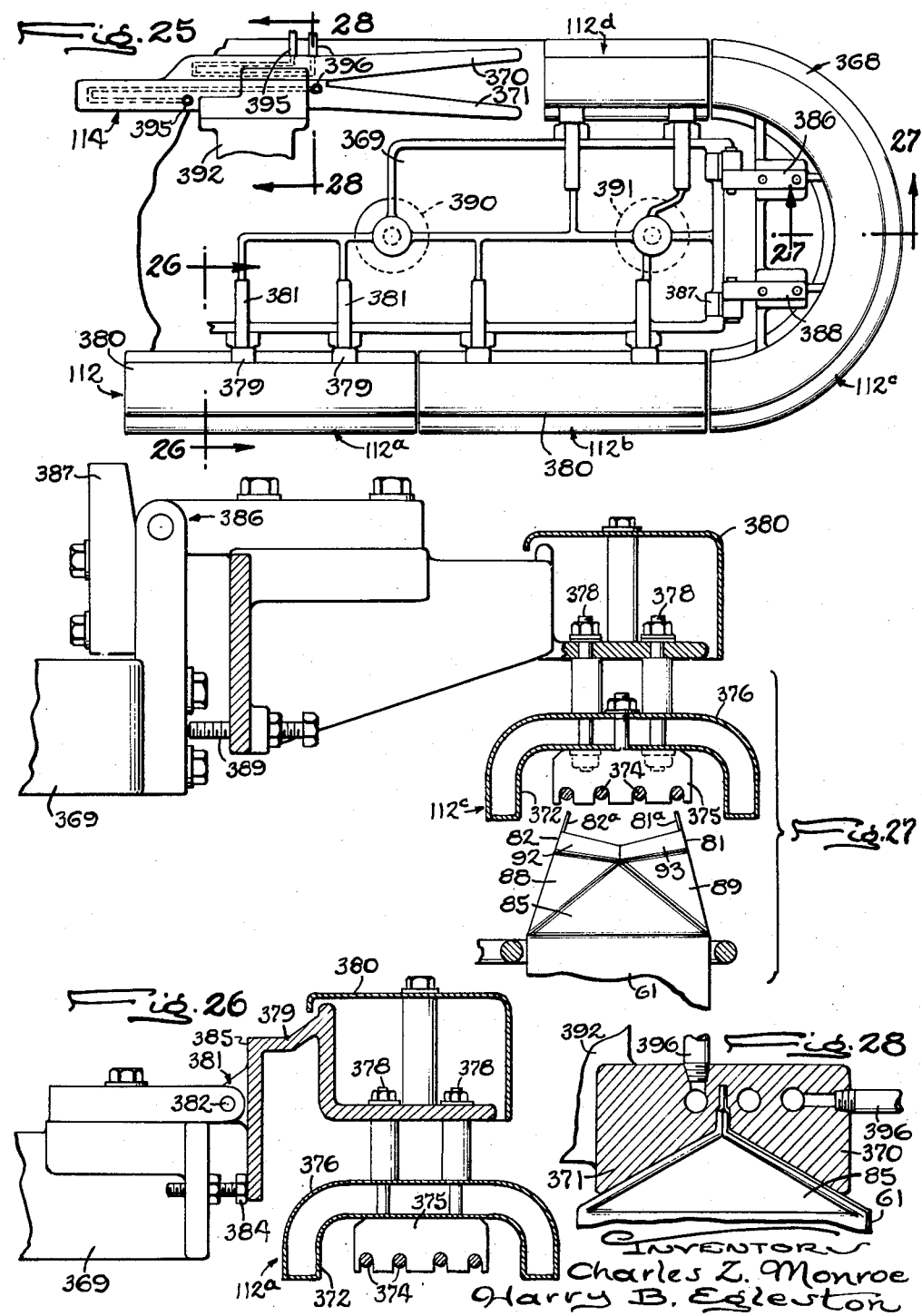

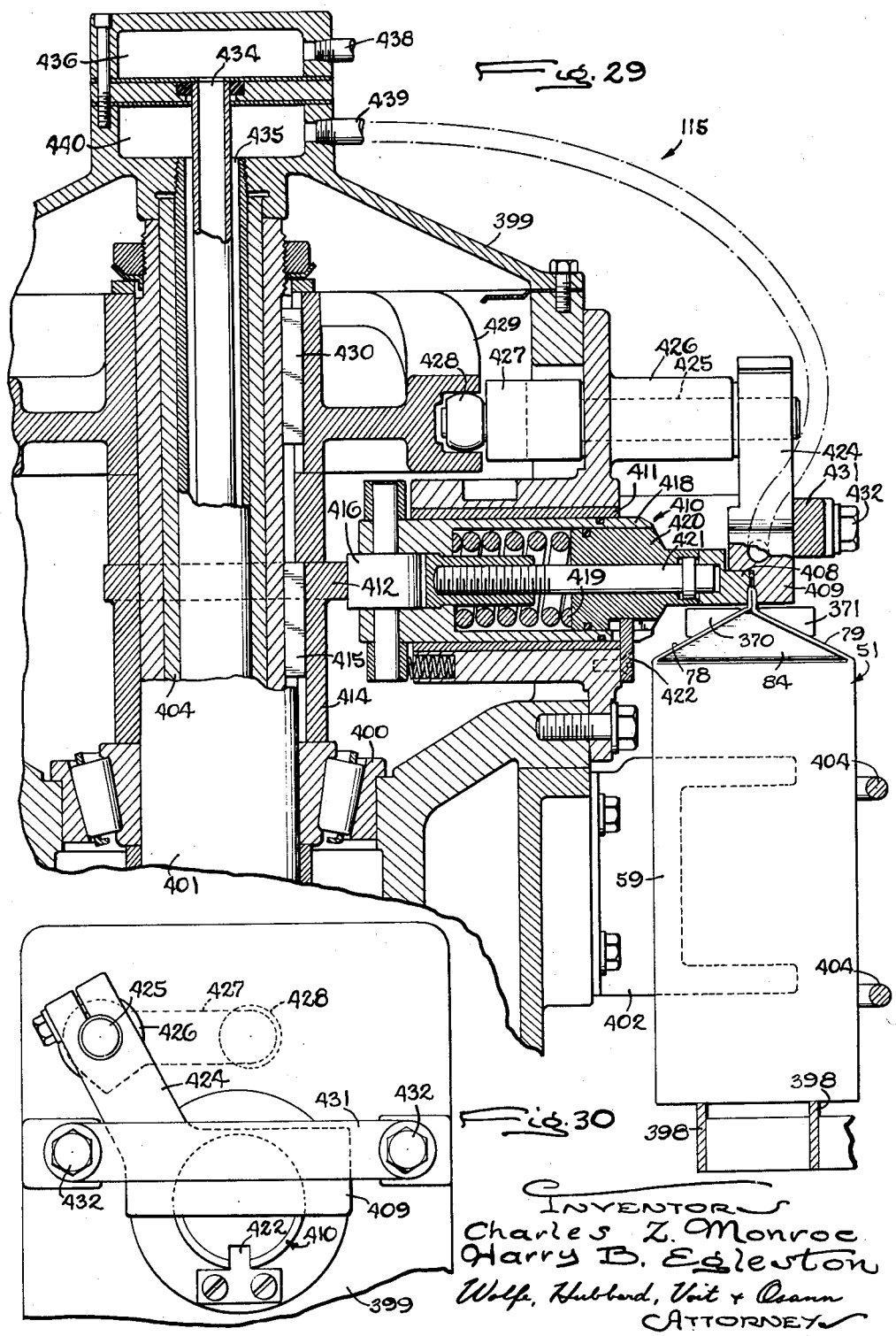

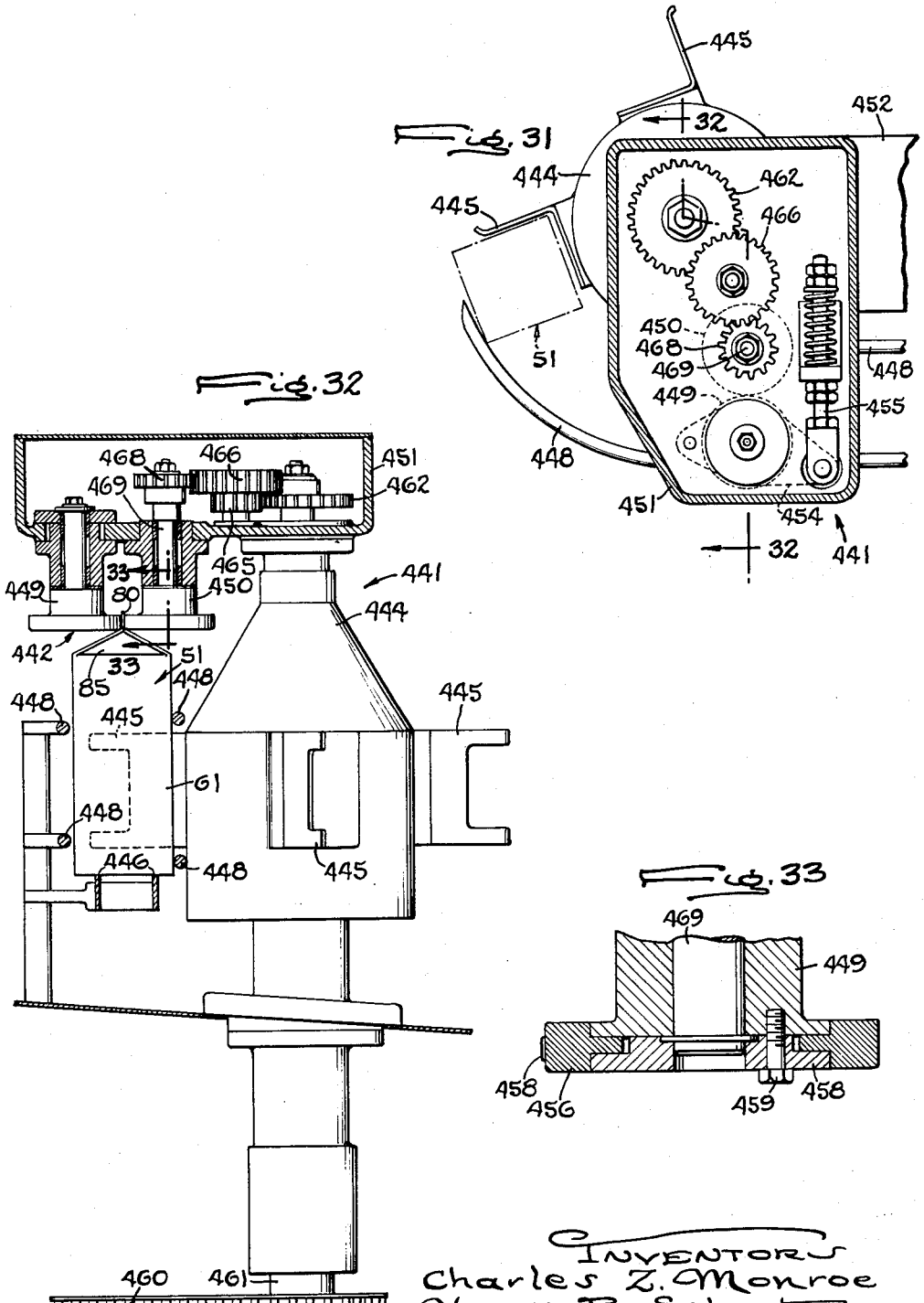

United States Patent Office 3,120,089
Patented Feb. 4, 1964

3,120,089
MACHINE FOR FORMING PLASTIC COATED
PAPERBOARD CONTAINERS
Charles Z. Monroe, Detroit, and Harry B. Egleston,
Livonia, Mich., assignors to Ex-Cell-O Corporation,
Detroit, Mich., a corporation of Michigan
Filed Nov. 7, 1960, Ser. No. 67,842
5 Claims. (Cl. 53—186)

The present invention relates to carton forming machinery and, more specifically, to a novel machine for forming, filling, closing and sealing plastic coated gable top containers of paperboard or the like. The machine finds particular, but not exclusive, utility in producing filled and sealed cartons from flat collapsed blanks of paperboard or the like having a thermoplastic moistureproof coating on their inner and outer surfaces.

One illustrative form of carton adapted to be processed by the machine disclosed and claimed herein is shown in Egleston et al. copending application Serial No. 707,259, filed in the United States Patent Office on January 6, 1958, and now abandoned. More detailed information on such carton may, of course, be had upon direct reference to such application. For present purposes, however, it will suffice to note that the container or carton disclosed therein is made of high grade paperboard stock coated on both sides with a thermoplastic material such as polyethylene. The polyethylene coating on the paperboard is utilized not only as a moistureproofing material but also serves as a heat and pressure sensitive adhesive which cooperates in sealing the closure elements of the container so as to make a fluidtight package. Because sealing involves the application of considerable heat and pressure, suitable precautions must be taken to avoid damaging the polyethylene coating as the cartons are erected and sealed. Major reasons for this are the relatively low melting point of polyethylene and its tendency to stick to heated surfaces.

One object of the present invention is to provide a high speed, automatic, precision machine for receiving stacked carton blanks of paperboard or the like each having a thermoplastic coating such as polyethylene on both sides and for forming such blanks successively into erected and filled cartons having tightly sealed top and bottom closures by utilizing the thermoplastic coating as an adhesive.

Another object of the invention is to provide a machine of the character set forth and which will be adapted to fuse and seal the coated closure elements of the carton without damaging the moistureproof integrity of the thermoplastic coating thereon.

A further object of the invention is to provide a machine of the character set forth and which is capable of being quickly loaded with carton blanks from a sanitary shipping case without direct human contact.

Still another object of the invention is to provide a machine of the foregoing type and which will effectively maintain the sanitary integrity of the carton from its initial stage as a flat collapsed blank until it emerges from the machine as a filled and sealed carton.

A further object is to provide a machine of the character set forth above having provision for selectively splitting the main drive of the machine to various actuating units so that discharge of previously completed cartons may take place even though a portion of the machine be stopped.

Other objects and advantages will become apparent in the light of the following detailed description, taken together with the accompanying drawings, wherein:

FIGURE 1 is a perspective view of an illustrative carton forming machine embodying the present invention.

FIG. 1a is a plan view of a flat collapsed carton blank in the form in which it is presented to the machine of FIG. 1 for processing.

FIG. 2 is a perspective view of an erected, filled and sealed carton in the condition in which it is discharged from the machine of FIG. 1 upon completion of its processing.

FIG. 3 is a bottom view of the carton of FIG. 2.

FIGS. 4a and 4b are companion diagrammatic views which together present a plan view of the main drive system of the machine.

FIG. 5 is an enlarged fragmentary vertical sectional view taken through a clutch member and its actuator in the plane of line 5—5 in FIG. 4b.

FIG. 7 is an enlarged perspective view showing the inside face of the blank of FIG. 1a, the blank being opened out flat for purposes of better illustration.

FIG. 8 is an enlarged fragmentary perspective view showing the bottom closure elements of the blank and carton of FIGS. 1a, 2, 3 and 7.

FIG. 9 is an enlarged fragmentary plan view of the blank feeder mechanism and the adjacent portion of the magazine of the machine.

FIG. 10 is an end elevational view of the mandrel wheel assembly of the machine including various associated units for operating on the carton at different stations along its path of movement.

FIGS. 11 and 12 are enlarged fragmentary views, in perspective and end elevation, respectively, detailing the bottom breaker mechanism.

FIG. 13 is a fragmentary elevational view showing a portion of the mandrel wheel assembly and the cooperating heater arrangement for preparing the bottom closure flaps for sealing.

FIG. 14 is an enlarged fragmentary sectional view through one of the mandrels and heating elements taken in the plane of the line 14—14 in FIG. 13.

FIG. 15 is an enlarged fragmentary transverse sectional view taken in the plane of the line 15—15 in FIG. 10 and showing a portion of the bottom closing mechanism and its associated drive.

FIG. 16 is an enlarged fragmentary vertical sectional view taken in the plane of the line 16—16 in FIG. 15 and detailing the manner in which the bottom closing unit tucks and closes the bottom flaps of the carton.

FIG. 17 is an enlarged fragmentary vertical sectional view through the carton bottom taken in the plane of the line 17—17 in FIG. 16.

FIG. 18 is a view corresponding to FIG. 17 but with the carton bottom elements in completely closed and sealed condition.

FIG. 19 is an enlarged fragmentary side elevation showing a portion of the rotary top breaker mechanism with a carton in place thereon.

FIG. 20 is an enlarged fragmentary vertical sectional view through the upper portion of the carton and certain rotary breaker elements.

FIG. 21 is an enlarged fragmentary perspective view showing the upper portion of the carton after it emerges from the top breaker mechanism.

FIGS. 22, 23 and 24 are fragmentary vertical sectional, perspective, and horizontal sectional views, respectively, detailing the rotary steepler mechanism of the machine.

FIG. 25 is a fragmentary plan view showing the top heating and closing mechanism of the machine.

Figure 6:
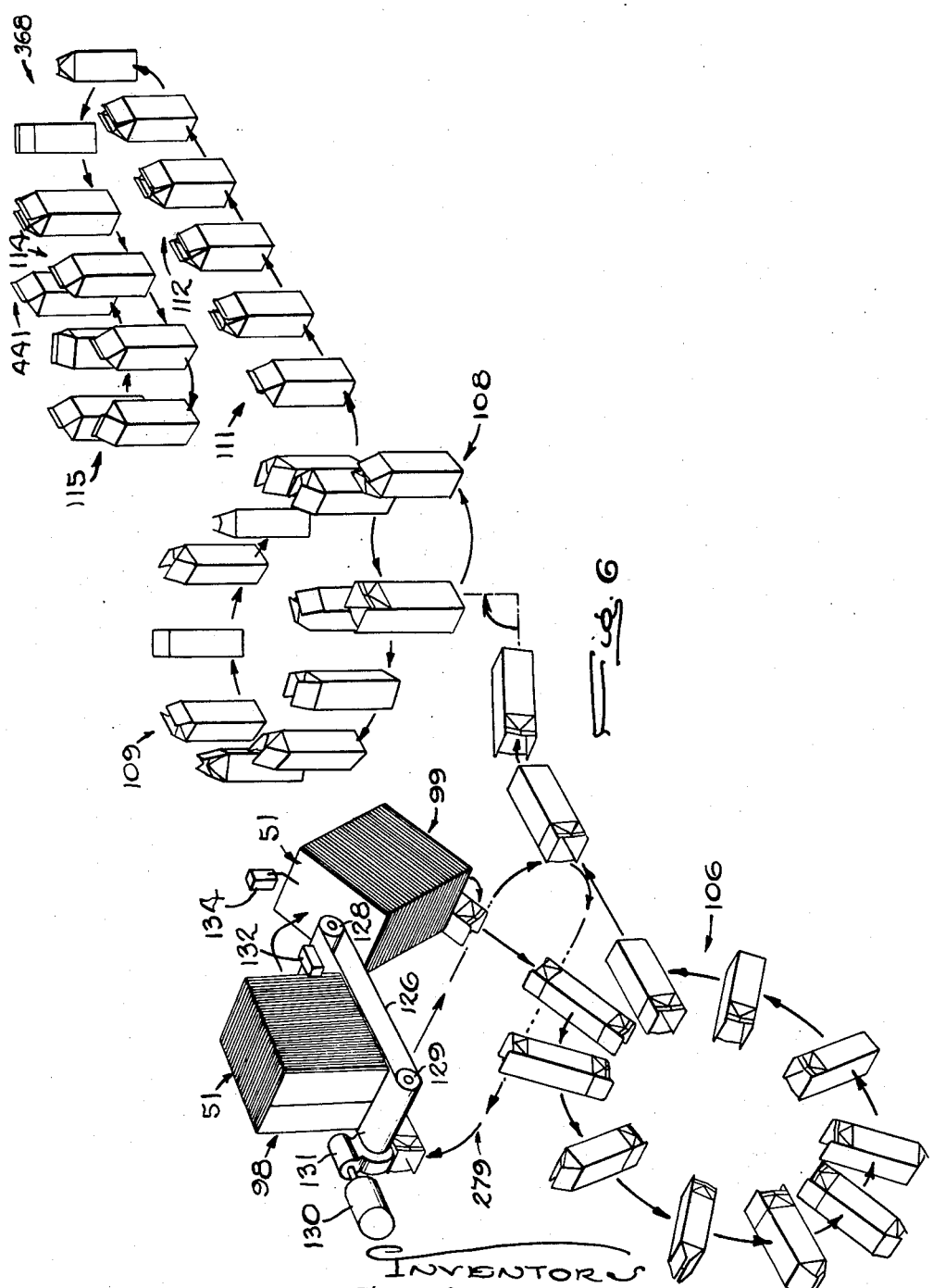
FIG. 6 is a diagrammatic perspective view illustrating the carton path and sequential positions of the carton as it passes through the machine incident to being processed therein.

FIGS. 26, 27 and 28 are enlarged fragmentary transverse sectional views through the mechanism of FIG. 25 and taken, respectively, in the planes of the lines 26—26, 27—27 and 28—28.

FIG. 29 is an enlarged fragmentary vertical sectional view through the rotary sealer turret of the machine.

FIG. 30 is an enlarged fragmentary front elevation of one of the sets of sealing elements on the turret of FIG. 29.

FIG. 31 is a plan view with certain parts in horizontal section, of the dater roll and delivery unit.

FIG. 32 is a vertical sectional view through the unit of FIG. 31, and taken in the plane of the line 32—32.

FIG. 33 is an enlarged fragmentary vertical sectional view through one of the dater rolls, taken in the plane of the line 33—33 in FIG. 32.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIG. 1, the invention is there exemplified in an illustrative machine 50 adapted to receive a supply of flat collapsed blanks 51 such as shown in FIG. 1a, process them automatically at high speed, and to discharge them in the form of filled and sealed cartons 52 such as the one illustrated in FIG. 2. Before presenting a detailed description of the machine 50, however, it would be desirable to outline briefly the salient features of the carton blank 51 and the carton 52 processed by the machine 50.

As shown more particularly in FIGS. 1a, 2, 3, 7 and 8, it will be noted that the carton 52 comprises a tubular body 54 of generally rectangular cross section having a bottom closure 55 and a top closure 56. Both the top and bottom closures are formed from integral extensions of the carton body and are held and sealed together in a manner which takes full advantage of the properties of the thermoplastic coating on the carton material.

The carton 52 is fashioned from a flat blank of paperboard or the like coated on both sides with thermoplastic material such as polyethylene, as pointed out earlier herein. The blank is divided by means of an appropriate pattern of score lines into a plurality of panels and areas which are utilized for the walls and the closure parts of the carton. Upon reference to FIG. 7, which illustrates the inner face of the blank, it will be noted that the body portion of the carton is defined by four side panels 58, 59, 60, 61 and a side seam flap 62 which is adhesively secured to the inner face of the side panel 58.

The bottom closure 55 is defined in part by a pair of major bottom panels 64, 65 which are integral extensions of alternate side panels 58, 60, and in part by a plurality of minor triangular panels 66, 67, 68 and 69, 70, 71 which are integral extensions of alternate side panels 59, 61. All of the bottom closure panels are integral parts of the blank and adjacent ones are separated from each other only by score lines which ultimately define the various folds or creases required to complete formation of the bottom closure. When the bottom closure is formed, the triangular panels 66, 69 fold inwardly toward one another and the respective pairs of smaller triangular panels associated with them fold back against the inner faces of the major bottom panels 64, 65. The projecting lateral edges 72 of the panel 64 are chamfered slightly, defining in the projecting portion of the panel 64 a tuck-in flap 64a which is inserted between the inner face of the major bottom panel 65 and the triangular foldback panels 68, 70 which tend to fold back toward the inner face of the panel 65. The bottom closure parts, when fully infolded, are pressed flat and heat sealed in this position, as illustrated in FIG. 3. Any potential leakage channels between folds, or exposed raw edges of the blank, are sealed as by means of linear shaped embossments 74, 75, and by transversely disposed embossments 76 in the shape of relatively short rectangular notches (FIG. 3).

The top closure 56 (FIG. 2) has substantially a gable top configuration comprising a pair of inclined roof panels 78, 79 surmounted by an upstanding top rib 80, defined in part by rib panels 81, 82. Interposed between the roof panels are triangular end panels 84, 85 each connected respectively to a pair of triangular foldback panels 86, 87 and 88, 89. Each pair of foldback panels is also connected to a corresponding pair of inner rib panels 90, 91 and 92, 93.

The top closure of the carton 52 also includes an extensible pouring spout which, in this instance, happens to be defined by triangular end panel 84, foldback panels 86, 87 and inner rib panels 90, 91. Initially, the spout is disposed in collapsed condition within the top closure and protectively sealed by means of sealing panels 81a, 82a which are abuttingly secured together along the entire length of the top rib. To facilitate easy opening of the carton 52 and accessibility of the pouring spout, the pouring edges of the latter, together with the major areas of the inner rib panels 90, 91, may be covered with a patch or lip 94 of adhesive material. By this is meant material which will not bond to itself or to the thermoplastic coating on the surfaces of the blank during heat sealing of the top closure. Consequently, upon application of upward and outward thumb pressure to the infolded triangular panels 86, 87 under the inclined roof panels 78, 79, the bond between sealing panels 81a, 82a and the outer ends of the inner rib panels 90, 91 becomes torn or fractured, rendering the spout accessible and permitting the same to be sprung into its outwardly extended position ready for pouring.

*General Machine Organization*

Referring more particularly to FIGS. 1 and 6, the illustrative machine 50 is adapted to receive a supply of flat folded tubular blanks 51 such as the one illustrated in FIG. 1a and described earlier herein. The blanks are stacked, top down, in a magazine from which they are successively withdrawn by means of a feeder, erected into open-ended tubular form and loaded onto a multi-station bottom forming mechanism which forms and heat seals the bottom closure. Following the formation of the bottom closure, the blanks are successively transferred to a rotary top breaker mechanism and thence to a rotary filler mechanism. After filling, the blanks, which are partially completed cartons open at the top, are presented to a rotary steepler mechanism, resulting in further breaking or flexing of the top closure elements about their score lines. The filled, open cartons are then conveyed beneath stationary top heater and closer units which activate the thermoplastic on the top closure elements and bring them together without applying any substantial pressure. The closed cartons are then presented to a rotary sealer unit which applies sealing pressure to the top closure elements. Following this, the filled and sealed cartons pass through a pair of dater rolls and are discharged in a continuous procession from the machine. For convenience, the partially completed cartons will be designated by the reference numeral 51 at their various stages of completion in the machine, and by the numeral 52 upon emergence from the machine as a finished product.

The machine 50 comprises a console 95 supported on legs 96 and supplied with utilities such as electric power, compressed air, and cooling water from appropriate external sources. A magazine loader 98 and magazine 99 are mounted on top of the console at one end of the machine. Operatively associated with the magazine and adjacent to it are a feeder mechanism 100 and a loader mechanism 101. On the side of the console below these mechanisms is the operator's control panel 102 for the machine and an emergency stop bar 104. To the left of the control panel 102 (as viewed in FIG. 1) and beneath the magazine loader 98, is the operator's indicator panel 105. The latter reflects satisfactory or unsatisfactory performances of the various units throughout the machine so that trouble spots can be quickly pinpointed and corrected.

Bottom forming mechanism 106 is situated roughly between the indicator panel 105 and the loader 101, being housed within an appropriate protective enclosure. The mechanism 106 is adapted to receive blanks successively from the loader 101, top down, and to move them from station to station in an orbital path to form their bottom closure. The blanks are then ejected and presented to a transfer receptacle which shifts them from a horizontal to a vertical position and presents them to a rotary top breaker unt 108 on top of the console. From this point on, the cartons remain above the top of the console.

The rotary top breaker unit 108, which happens to rotate counterclockwise when viewed from the top, presents the open top carton to rotary filler unit 109. The latter, which rotates clockwise when viewed from the top, fills the cartons successively and presents them to a main conveyor 110. The main conveyor thereupon moves the filled cartons, still open at the top, under a rotary steepler mechanism 111, and thence under stationary top heater and closer units 112, 114. From here, the filled and closed cartons are transferred to a rotary top sealer unit 115. After final sealing on the later, the filled and completed cartons are passed through dater rolls and discharged from the machine.

The Magazine and Magazine Loader

Turning now to FIGS. 1, 6 and 9, it will be noted that the magazine 99 comprises a plurality of guide bars 116 spaced laterally along a downwardly inclined support equipped wth skids 117. The guide bars are spaced apart an appropriate distance to receive therebetween a stack of flat collapsed blanks 51 of the form shown in FIG. 1a and are supported by posts 118, 119 fixed to the machine console. The stack of blanks is inserted between the guide bars top down, with their top edges resting on the skids 117 and with the side panels 58, 61 facing the discharge end of the magazine. The stack is retained in place as by means of stop abutments 120 situated at the lower ends of the guide bars 116. Blanks are withdrawn successively from the lowermost end of the magazine by means of a suitable feeding device and subjected to further processing in the machine.

The magazine loader 98 is adapted to receive blanks directly from a shipping box, without direct human contact, and to maintain automatically a supply of blanks in the magazine 99 at all times during the operation of the machine. The loader 98 (FIGS. 1 and 6) comprises a pair of guide walls 121, 122 spaced laterally a distance corresponding to that between the magazine guide bars 116 and terminating adjacent the upper ends of the latter. The outermost guide wall 121, adjacent the operator's side of the machine, includes a hinged tray 124 corresponding in size and shape to the shipping box in which the flat folded, collapsed blanks 51 are customarily supplied to the dairies. Upon inversion of the shipping box, its entire contents may readily be placed on the tray 124 with the latter in substantially a horizontal position and entirely without direct human contact. The blanks are so oriented on the tray 124 that when the latter is swung upwardly into its vertical position, shown in FIG. 1, the stack of blanks is arranged with the top closure elements down and the blanks occupying the same orientation that they occupy in the magazine. The stack of blanks in the loader is built up to the point that the endmost blank closest to the magazine is adapted to abut against a resiliently loaded stop arm 124 situated adjacent a fixed guide 125.

Between the guide walls 121, 122, the floor of the magazine loader is defined by one or more flexible belts 126 extending between a pair of support rollers 128, 129. The upper reaches of the belts 126 are supported intermediate the rollers so that they will carry the weight of the blanks without sagging. The belts 126 may be driven by means of a motor 130 and reduction gear unit 131 connected to the roller 129.

The motor 130 in this instance is controlled by two series connected switches. This includes a stack switch 132 situated on one of the guide walls of the magazine loader and adapted to sense the presence of the stack of blanks therein, and a void switch 134 situated at the rear of the magazine and adapted to detect the presence of a void, or in other words, the need for additional blanks.

In operation, when the supply of blanks in the magazine 99 dwindles to the point where the void switch 134 is tripped, and the stack switch senses the presence of an additional supply of blanks in the magazine loader, the motor 130 is energized and the belts 126 are driven so that their upper reaches travel toward the magazine. This tends to deliver a fanned out procession of flat collapsed blanks 51 from the magazine loader to the top of the stack in the magazine. Such action occurs at a rate faster than that at which the blanks 51 are withdrawn from the magazine, with the result that the stack in the magazine accumulates to sufficient height to trip the void switch 134. This serves to deenergize the drive motor 130 and the latter remains deenergized until a new void develops in the magazine and adequate blanks are available in the magazine loader to replenish the magazine.

Feeder and Loader Mechanisms

The feeder and loader mechanisms 100, 101 (FIGS. 1, 9 and 10) are adapted to withdraw blanks successively from the magazine, erect them into open-ended tubular form, and then load them into the bottom closing mechanism 106. For such purpose, these mechanisms are driven in synchronism with each other from the main drive of the machine.

In the present instance, the feeder 100 comprises a pivotally mounted gate member 135 adapted to swing through an angle of about 90 degrees between the two positions shown in FIG. 9. The gate includes a plurality of vacuum pick-up cups 136 adapted to engage side panel 61 of the lowermost blank in the magazine. Outward movement of the gate 135 after engagement causes the blank to commence opening, as shown in FIG. 9, and snap past the stop abutments 120. With further outward movement of the gate, the left-hand lateral edge of the blank is cammed against fixed arcuate guide 138, opening the blank still further until it reaches its fully squared position at the end of the arcuate travel of the gate.

The loader 101, which happens to be of a well known form, comprises an endless chain 139 having an outwardly projecting finger 140 thereon. The chain is arranged to move the finger 140 through a downward stroke generally parallel to the side walls of the squared blank. In the course of such movement, the finger 140 accosts the upstanding edge of the bottom closure panel 64. When this occurs, the vacuum cups 61 on the gate release the blank and the latter moves downwardly along fixed guides (not shown) until it telescopes over a mandrel 141 on the bottom forming mechanism 106.

Bottom Forming Mechanism

The bottom forming mechanism 106 (FIGS. 4a and 10) comprises an intermittently driven mandrel assembly 142 carrying a plurality of radially disposed mandrels 141, in this instance ten in number, and a plurality of cooperating station units with which the mandrels are adapted to register sequentially during the course of their intermittent or indexing movement. These station units are a bottom breaker unit 144, a plurality of heater units 145, 146, 147, a bottom closing unit 148, and two bottom sealing units 149, 150. Both the mandrel assembly and the station units are supported on a relatively heavy upright frame panel 151 within the machine console.

The mandrel assembly 142 comprises a relatively large diameter hollow shaft 152 journaled in an apropriate bearing 154 carried by the frame panel 151 and projecting substantially beyond both faces of the latter. The end of the shaft 152 extending toward the control panel side of the machine has fixed thereto a large polygonal hub 155. In the present instance, the hub 155 has ten equally spaced annular seats on its outer surface and which receive the inner end portions of the mandrels and their mounting flanges 156. Each mandrel is constructed with a cooling chamber 158 (FIG. 10) adjacent its outer end to preclude adhesion between the end face of the mandrel and the bottom closure parts of the carton 51 being formed thereon. Water or other suitable fluid coolant is circulated through the chambers 158 via supply and exhaust conduits 159, 160 in each mandrel which may be connected in any suitable manner with coolant supply and exhaust lines 161, 162 (FIG. 4a) through the hollow shaft 152.

Power for driving the mandrel assembly 142 with a step-by-step indexing motion is furnished by main drive motor 164 of the machine via chain and sprocket drive 165 and main drive shaft 166. The latter has fixed thereon a barrel cam 168 which drives a spider wheel 169 keyed or otherwise secured to the mandrel assembly shaft 152. The track of cam 168 includes sufficient dwell so that the spider 169, through its follower rollers 170, is given an intermittent angular motion which is, of course, imparted to the mandrel assembly.

Following the loading of an open-ended carton blank 51 on the mandrel by the loader mechanism 101, top down, the mandrel assembly moves the blank through two indexing steps, the second step bringing the blank into register with the bottom breaker unit 144 (FIGS. 10, 11 and 12). In this position, all the bottom closure panels overhang the end of the mandrel and the common score line connecting them to the carton side panels is approximately even with the end face of the mandrel. The major bottom panel 65 is in leading position and the other major bottom panel 64 is in trailing position with respect to the direction of mandrel movement. Minor triangular panels 66, 67 and 68 face the operator's side of the machine, while minor triangular panels 69, 70, 71 face the main frame panel 151.

The bottom breaker unit 144 is adapted to effect substantial prebending of the bottom closure parts on their respective score lines and toward their closed position. The prebending action is carried to a sufficient extent to create along each score line, in so far as possible, a permanent set in the paperboard and its thermoplastic coating. This greatly facilitates the subsequent closing and sealing of the bottom closure elements of the blank.

As illustrated in FIGS. 10 and 12, the bottom breaker unit 144 comprises a relative heavy bridge or frame member 171 fixed to the main frame panel 151 in generally overlying relation with the mandrel assembly 142. The bridge member 171 carries a crosshead 172 and fixed to a guide plunger 174 and both mounted for reciprocation along a projection of the radial axis of the underlying registered mandrel. Depending from the underside of the crosshead 172, and adapted to cam the major bottom panels 64, 65 inwardly as the crosshead approaches the end face of the mandrel, are a pair of folder wings 175, 176 (FIGS. 10 and 11). In the present instance, the folder wings 175, 176 are fashioned as stamped plates of relatively heavy gauge sheet metal fixed to the underside of the crosshead 172 in any suitable manner.

Pivotally mounted on the bridge 171, and adapted to exert inward folding pressure on the minor triangular panels 65 and 66 as the crosshead descends with the folder wings 175, 176, are a pair of triangular folding fingers 178, 179. The latter may also be fashioned as stampings of relatively heavy gauge sheet metal. The fingers 178, 179 are fixed as by means of mounting blocks 180, 181 to respective ones of a pair of rock shafts 182, 184 journaled on the bridge 171 in straddling relation with the other end of the mandrel. Each of the rock shafts 182, 184 has an end portion extending beyond the bridge 171 and carrying a corresponding one of a pair of rocker arms 185, 186. The latter have adjacent their projecting ends follower bosses or rollers 188, 189 which engage corresponding ones of cam tracks 190, 191 in depending cam arms 192, 194 fixed to the crosshead. In the present instance, the arms happen to be integral parts of a bifurcated plate member 195 rigidly fixed to the left-hand end of the crosshead (as viewed in FIG. 10). By reason of this connection, it will be appreciated that the fingers 178, 179 are rocked inwardly as the crosshead approaches the mandrel face with the wings 175, 176, and outwardly as the crosshead and wings retreat from the mandrel face.

For the purpose of driving the crosshead, folder wings and folder fingers in timed relation with the mandrel assembly so that the folding of the bottom closure panels will occur while the mandrel dwells in registered position with the bottom breaker unit, the latter is connected to the main drive shaft 166. The drive comprises a chain and sprocket take-off 196 from the main drive shaft 166 and which rotates a small crank shaft 198 journaled in a boss 199 fixed on the rear side of the main frame panel 151 (FIGS. 4a and 12). The boss 199 is mounted on an outwardly extended arm 200 fixed in any suitable manner to the frame panel 151. The crankshaft 198 has fixed thereon a crank arm 201 which in this instance is drivingly connected to a rocker arm 202 by means of an angularly disposed, adjustable swivel link 204. The rocker arm 202 is pivotally mounted on brackets 205 fixed to the frame panel 151 and extends through aligned slots 206, 208 in the panel 151 and rear wall of bridge 171. The forwardly extending end of rocker arm 202 is formed with a slot 209 which engages a pin 210 fixed between a pair of lugs 211 on the crosshead 172. By reason of this arrangement, rotation of the crankshaft 201 will effect oscillation of the rocker arm 202 and this, in turn, will effect reciprocation of the crosshead 172 and the parts associated therewith. Even though there is a small amount of angularity between the plane of rotation of the crank 201 and the plane of oscillation of the rocker arm 202, the swivel link 204 provides adequate accommodation.

Following the bottom breaking operation, the mandrel assembly indexes the carton 51 around to the heater stations 145, 146 and 147. In order to avoid overheating of the bottom with possible damage to the paperboard or the thermoplastic coating, and yet drive sufficient heat into the bottom closure panels to achieve effective sealing, resort is had to a series of heating stations, in this instance, three in number (FIGS. 4a, 10, 13 and 14). These stations are substantially identical and are adapted to apply warm air to both sides of the bottom closure panels so as to raise their temperature sufficiently to activate the adhesive action of the thermoplastic coating on the carton blank. Where polyethylene is used as such coating, the temperature of the blank must be increased to approximately 350 to 500 degrees Fahrenheit.

As shown more particularly in FIGS. 13 and 14, each heater station comprises a hollow boxlike heater head 212 fixed to the main panel and adapted to nestingly straddle the radially projecting bottom closure panels of the carton 51 as is held in position by an underlying registered mandrel. For this purpose, the head 212 includes a tunnel 214 which receives the bottom closure panels and which is defined by a plurality of perforated walls 215, 216 and 217. Each of the latter has a series of relatively small diameter nozzle passages 218 arranged in spaced relation over its face area and adapted to apply warm air to the adjacent bottom closure panels of the blank. Air is supplied to the passages 218 from a plenum chamber 219 within the head. The relative amount of air discharged from the passages 218 of any of the walls 215, 216, 217 may be suitably regulated as by means of baffles 220 in the chamber 219.

Air is supplied to the heater heads 212 from a blower 221 mounted near the lower left corner of the frame panel 151 as viewed in FIGS. 4a and 13. The blower 221 discharges into a vertical manifold 222 which connects at vertically spaced points with three separate combustion chambers 224. The latter are connected to respective ones of the heads 212 via individual supply ducts 225, 226 and 227 (FIG. 13) which communicate respectively with the plenum chamber of each head.

Each combustion chamber 224 includes an appropriate gas burner and igniter (not shown). Each burner is supplied with an appropriate mixture of air and gas from an external supply via a control valve 228 and branch line 229. Combustion is, of course, carefully controlled so as to be as complete as possible. With an excess of air (as far as the burner is concerned) supplied to the burner, the combustion products mix with the excess air in the combustion chamber, resulting in the discharge of a blast of heated air at each heater head 212 having, in the present instance, a temperature of about 800 degrees Fahrenheit. By the time the blank 51 is ready to leave the last heater station 147, its bottom closure panels have been heated to a temperature of 350 to 500 degrees Fahrenheit and are ready for closing and sealing.

Provision is made for automatically reducing the temperature and amount of warm air discharged from the heater heads 212 to prevent thermal damage to the carton blanks thereunder in event of a temporary stoppage of the machine due, for example, to a jam at some transfer point. This is accomplished in part by curtailing the amount of air supplied by the blower 221 and in part by curtailing the amount of gas supplied to the burners of the combustion chamber. Referring further to FIG. 13, it will be noted that in the present instance a shut-down baffle 230 is interposed in the manifold 222 between the blower 221 and the first outlet opening. The baffle 230 is fixed to a rocker arm 231 spring-biased to hold the baffle in a normally open position. The rocker arm 231 is also connected to an actuator 232, which may be a solenoid or an air cylinder, related to the main drive control in such a manner that it shifts the rocker arm and baffle to a shut-down position upon stoppage of the machine. By the same token, the air-gas control valves 228 are similarly related to the main drive control so as to shift to a shut-down position concurrently with, or slightly before, the baffle 230.

The shut-down position of both the baffle 230 and valves 228 in this case is such as to drastically curtail the flow of the air-gas mixture, and the secondary air, respectively. The baffle 230 and valves 228 shift to open position, restoring the flow of air and gas, as an incident to restarting of the machine. In some instances, however, it may be preferable for these members to stop the flow of air and gas altogether during stoppage of the machine. In that event, the burners are ignited as an incident to restarting of the machine.

After the heating operation, the mandrel assembly indexes and carries the blank 51 from the last heater unit 147 to the bottom closing unit or station 148 (FIG. 10). At this point, the bottom closure panels have been heated to a temperature sufficient to activate the adhesive action of their thermoplastic coating. In such condition, the particular coating used on the blank 51 will adhere to itself and to hot surfaces but not to cold surfaces of other material.

The bottom closing unit 148 (FIGS. 10, 15 and 16) comprises a support block 234 fixed to the lower portion of the frame panel 151. The support block carries a closer shoe 235 and its guide plunger 236, both mounted for reciprocation approximately along a projection of the radius of the registered mandrel. The upper face of the closer shoe 235 is concave in a direction transverse to the plane of rotation of the mandrel assembly, such shape being defined by two angular surfaces. One such surface is undercut with respect to the other, defining a transverse slot 238 and a wedge-shaped tuck-in blade 239 in the central portion of the shoe (FIGS. 10 and 16). Upon elevation of the shoe 235 toward the mandrel (FIGS. 15, 16), the slot 238 is adapted to engage the projecting end of the major bottom panel 65. At the same time, the blade 239 is adapted to engage the major bottom panel 64 and to tuck it into the space between the inner face of the panel 65 and the adjacent triangular fold-back panels 68, 70 (FIGS. 16, 17). The shoe 235 dwells in elevated position for a sufficient interval to permit withdrawal of the blade 239 from the closed, tucked-in bottom as an incident to the next step of indexing movement of the mandrel assembly.

For the purpose of assuring proper orientation of the bottom closure panels on entering and leaving the closing station 148, the latter is equipped with fixed arcuate guides 240, 241. The guide 240 is disposed to prevent jamming or tearing of the free lower end of the bottom panel 64 against the edge of the shoe 235 when the same is in lowered position. The guide 241, on the other hand, is arranged to hold the closed bottom in that condition as the mandrel assembly moves it from the raised shoe 235 to the sealing station 149.

Provision is made for driving the closer shoe 235 to reciprocate in properly timed relation to the mandrel assembly. For this purpose, the main drive shaft 166 has fixed thereon a face plate cam 242 (FIGS. 4a and 15). The latter drives, through follower roller 244, a reciprocating plunger 245 slidably mounted in a fixed sleeve 246 to the rear of the main frame panel 151. The plunger 245 has rack teeth which mesh with pinion 248 fixed to cross shaft 249. The latter extends into the support block 234 and has another pinion 250 fixed thereon. The pinion 250, in turn, drivingly meshes with rack teeth on the guide plunger 236 of closer shoe 235 (FIGS. 10 and 15).

From the bottom closing unit 148, the blank 51 next passes to the bottom sealing units 149, 150. The latter are substantially identical and, in this instance, two such units are used in order to subject the bottom closure to pressure for the necessary total interval of sealing time. As illustrated in FIG. 10, each sealing unit comprises a pressure pad 251 having fluid coolant circulating therethrough via inlet and outlet passages 252 and 253. Each pressure pad is pivotally connected as by pin 254 to a rocker arm 255 which is adapted to move it through a relatively short displacement between a pressure applying position where it squeezes the bottom closure panels against the end face of the mandrel, causing them to assume the condition of FIG. 18, and an inactive position spaced farther away from the end face of the mandrel. The pivotal mounting tends to give each pressure pad a limited amount of float, permitting it to accommodate readily to the bottom closure elements of the blank 51 as it presses them against the end face of the mandrel.

The rocker arms 255 are driven by respective ones of rock shafts 256 and 258 which extend through the main frame panel 151 (FIGS. 4a and 10). The inner ends of the rock shafts are respectively provided with crank arms connected through appropriate links to an oscillating collar 259 journaled on the mandrel assembly shaft 152 (FIG. 4a). The oscillating collar has fixed thereto a driving arm 260 which carries a follower roller 261, the latter engaging the track of a barrel cam 262 rigidly secured to the main drive shaft 166. Arcuate guide shoes 241, 264 and 265 assure proper entry and exit of the carton 51 into and out of registry with each of the bottom closing units 149, 150 (FIG. 10).

*Transfer and Sanitizer Mechanisms*

After the bottom seal is completed, the mandrel assembly indexes through another step and carries the blank 51 to a transfer station which, as indicated in FIGS. 4a and 10, is one step short of the loading station. At the transfer station, the mandrel and blank 51 are substantially horizontal and the bottom closure occupies a radially outward position on the mandrel. The blank 51 is thereupon stripped from the mandrel by means of a reciprocating transfer mechanism 266 driven in timed relation with the main drive of the machine.

In this case, the transfer mechanism 266 comprises a block member 268 slidably mounted on a guide bar 269 substantially parallel to the plane of the mandrel assembly and offset a slight distance therefrom (FIG. 4a). The block 268 is reciprocated along the guide bar 269 as by means of a chain and sprocket drive 270 actuated by the main drive of the machine. The drive 270 is pivotally connected to the block 268 by means of a link 271 pivotally attached to a chain link in the drive 270. The block 268 includes a pivotally mounted catch finger 272 for engaging the top edge of the blank and stripping it from the mandrel. The catch finger 272 is held in retracted position as by means of a solenoid 274 on the block until the finger is ready to engage the top of the blank for the stripping stroke.

For stopping the blank 51 after stripping the block 268 is provided with a retractable arm 275 having a stop dog 276 fixed thereon. The arm 275 is retracted clear of the stripped carton during the return stroke of the block 268 toward the mandrel by means of a connecting link 278 pivotally attached at intermediate points on the arm and on the driving link 271.

While machines such as the one disclosed herein have formed cartons with uniformly high sanitary integrity, there may be some instances where a sanitizer unit 279 is desired by the user or required by local health regulations. Such a unit, shown diagrammatically in FIG. 4b, may comprise a conveyor 280 driven from main shaft 166 by an appropriate power take-off 281. The conveyor 280 may be provided with a plurality of open-ended carton receptacles 282 and is adapted to move them in an orbital path running transversely of the machine so as to expose the open ends of the cartons 51 to one or more germicidal lamps 284 (FIG. 4b). After traversing such orbital path, each blank 51 is returned to a position aligned with the transfer mechanism and is ejected from the receptacle 282 by pusher dog 283 situated at the end of an extension of the retractable arm 275, thereupon passing into basket 285 of uprighting transfer arm 286.

In situations where the sanitizer unit 279 is not present in the machine, the arm 275 and pusher dog 283, during the stripping stroke, simply push the preceding blank through the space which would otherwise be occupied by receptacle 282 of the sanitizer unit and into the basket 285 of the uprighting transfer arm 286.

The uprighting transfer arm 286 is adapted to oscillate through an arc of substantially 90°, receiving a carton 51 bottom first, uprighting it to a vertical position, and presenting it to the rotary top breaker unit 108. The arm 286 is driven in timed relation with the main drive of the machine. In this instance, such is accomplished by means of a barrel cam 289 fixed to main drive shaft 166 and which actuates a follower roller 290, crank arm 291, and rock shaft 292 (FIG. 4b). The latter is connected to the arm 286 for driving the same and the connection preferably includes a detent (not shown) adapted to slip in the event that the arm becomes jammed.

*Rotary Top Breaker Unit*

Turning now to FIGS. 1, 4b, 19 and 20, it will be noted that the rotary top breaker unit 108 comprises a rotating turret 294 mounted on top of the machine console 95. In this instance, the turret 294 has four carton receptacles, each defined by pairs of laterally spaced bars 295 and a bottom support shelf 296. Arcuate guide rails 298 fixed on upright posts 299 prevent the cartons from falling out of the receptacles as the turret rotates. The unit 108 is adapted to receive cartons successively transferred from uprighting arm 286 along guide rails 300 and to prebend the top closure panels of the partially completed carton 51 along their various score lines. This is accomplished in each carton as the latter moves from the transfer point adjacent the guide rails 300 to another transfer point a little over 180° away where the carton is presented to the rotary filler unit 109.

For the purpose of effecting such prebending as an incident to rotation of the turret 294, the latter is provided with a breaker head 301 situated in overlying relation with each carton receptacle. Each breaker head 301 in this case happens to be of inverted T-shape and is mounted on an upstanding plunger 302. The latter extends downwardly into the housing of the turret 294 and carries a follower roller 304 which engages the track of a relatively large fixed cam 305 within the turret housing. Mounted in depending relation from each is head 301 and overlying the associated carton receptacle is a bending anvil 306 having a pair of opposed bending knees 308. The anvil 306 is supported as by means of bracket 309 fixed to the head and a depending stem 310 fixed to the bracket. Upon rotation of the turret, it will be perceived that the head 301 will descend under the action of the cam 305 until the head accosts the housing of the turret 294, at which point the bending knees 308 will be opposite the horizontal score line in the blank 51 which separates the side panels and the top closure panels.

For infolding the triangular end panels 84 and 85 of the top closure, the head 301 is provided with a pair of triangular folder fingers 311 and 312 (FIGS. 1, 19 and 20). The latter are secured in any suitable manner to a pair of laterally spaced rock shafts 314, 315 projecting outwardly from the head 301 and adapted to fold the fingers 311 and 312 inwardly toward the anvil 306 upon descent of the head 301. Such action may be accomplished by means of rack and pinion connections 316 between the rock shafts 314, 315, and plunger 302 actuated by overrun of the plunger 302 further into the turret housing 294 after the head 301 has descended.

As a result of the foregoing action, the top closure panels of the carton 51 are prefolded inwardly to a position approximating that shown in FIG. 21. In order to permit withdrawal of the anvil 306 from the carton upon elevation of the head 301, the unit 108 is provided with a stripper plate 318 for each receptacle. Each plate has a horizontal ledge 319 overlying the top edge of the carton and in position to strip it from the anvil 306 as the latter is elevated.

The turret 294 may be driven in timed relation with main drive shaft 166 by any appropriate power take-off. In the present case, this comprises bevel gears 320, 321, cam shaft 322 and spiral gears 324, 325 (FIG. 4b).

*Filler Unit*

The filler unit 109 is arranged to receive cartons in succession from the top breaker unit 108 and to fill them while they remain in continuous motion along their path through the machine. The unit 109 comprises a plurality of filler heads 326, in this case ten in number, each such head being similar to the one disclosed and claimed in our copending United States application Serial No. 808,854, filed April 24, 1959. Further details of the filler heads may, of course, be had upon reference to aforesaid application Serial No. 808,854. For present purposes, however, it will be sufficient to note that the heads 326 of the unit 109 are actuated to fill their underlying cartons by means of a fixed cam (not shown) situated within the housing of the unit 109. In this instance, the unit 109 is driven from main drive shaft 166 via a direct take-off comprising spiral gears 328, 329 (FIG. 4b) The arrangement is such that cartons are filled at highspeed in proper relation with the other units of the machine yet the filling action is sufficiently gradual for each individual carton so that foaming and spillage problems are virtually eliminated.

Rotary Steepler Mechanism

After the carton has been filled, its top closure panels, even though prebroken, tend to return toward their fully open position. This may be due to a variety of reasons, including the outward pressure on the carton walls resulting from filling and also to the nature of the particular thermoplastic coating on the carton. For example, polyethylene tends to return gradually to its original position even after substantial deformation and this quality is to some extent reflected in a carton where it is used as a coating on the paperboard. Another factor is that in the present instance, rotary top breaker acts directly on the infolded triangular panels 84, 85 of the blank but only indirectly on the inclined roof panels 78, 79.

In view of the foregoing, and in order to obtain adequate application of heat for top closing and sealing, steepler mechanism 111 (FIGS. 1, 6, 22, 23 and 24) is mounted along the carton path between the filler unit 109 and the top heater unit 112. The unit 111 includes a steepler member 330 adapted to engage the top closure panels of each carton as the latter is carried thereunder by main conveyor 110.

The steepler member 330 comprises a pair of downwardly inclined folder plates 331, 332 giving it a generally inverted Y-shaped cross section along the path of carton travel. Mounted in depending relation between the plates 331, 332 and vertically disposed is another folder plate 334 having a lower edge 335 of shallow inverted V-shaped contour. With this arrangement, it will be appreciated that as the member 330 is brought down against the top of the carton 51 (FIG. 22) the folder plates 331, 332 will cam inwardly respective ones of the major top panels 78, 79 and their associated top rib panels 81, 81a, 82, 82a. At the same time, the lower edge of central folder plate 334 applies an inward camming action on the upper edges of the inner rib panels and, specifically, at the top end of the score lines between the rib panels 92, 93 and 90, 91. Such action also results in substantial inward folding of the triangular end panels 84, 85. The folding action is sufficiently rigorous so that the top closure panels are left in partially infolded condition as the carton is presented to the top heater 112.

Provision is made for driving the steepler member 330 in an orbital path aligned with and overlying the path of the carton on the main conveyor 110. During the lower pass of such orbital movement, the member 330 drops down into engagement with the carton top without interrupting the continuous movement of the carton on the conveyor. Conversely, on the upper pass of its orbital movement, the member 330 returns to initial position from which the cycle is repeated for the next succeeding carton.

In this instance, the member 330 is fixed to a mounting shaft 338 journaled eccentrically in a carrier 339 mounted in the front wall of steepler housing 340 (FIGS. 22, 23 and 24). The carrier 339 is rotated by means of a drive shaft 341 journaled in any appropriate manner within the housing 340 and fixed to the carrier as by means of pin 342. The end of the shaft 338 remote from the member 330 has keyed thereon a planetary gear 344. The latter meshes with an idler gear 345 having the same number of teeth and freely journaled on a stub shaft 346 fastened to the carrier. The idler gear 345 meshes with a fixed sun gear 348 also having the same number of teeth and which is journaled on the shaft 341. The sun gear 348 is precluded from rotation as by means of an integral sleeve 349 having lugs 350 which lock with corresponding slots in a fixed collar 351 on interior bearing web 352 of the housing.

With this arrangement, it will be noted that rotation of the steepler drive shaft 341 will rotate the carrier 339 causing it to move the steepler member 330 orbitally about the axis of shaft 341. Due to the identity of the numbers of teeth of the gears 344, 345, 348 and to their planetary action, the steepler member 330, together with its shaft and gear 338, 344, maintain the same attitude throughout their orbital movement. Consequently, the steepler member moves parallel to itself throughout the upper and lower passes of its orbital travel.

For the purpose of driving the shaft 341 in synchronism with the main machine drive, a spiral gear 354 is fixed on the shaft 341 in meshing engagement with a horizontally disposed spiral gear 355. The latter is fixed via a common shaft 356 to a smaller diameter spur gear 358. The gear 358, in turn, drivingly meshes with a relatively large spur gear 359 keyed or otherwise secured to an upstanding extension of main conveyor drive shaft 360. In this instance, the shaft 360 is driven as by means of a chain and sprocket connection 361 and spiral gears 362, 364, the latter being fixed on an extension 365 coupled to the main drive shaft 166 (FIG. 4b).

Top Heater and Closer Assembly

As noted earlier herein, the top heater and closer assembly 368 (FIGS. 1, 25, 26, 27 and 28) is adapted to prepare the top closure panels of the filled carton 51 for heat sealing and to close the top of the carton, bringing into adhesive contact the panels which have been adhesively activated. Such contact is made, however, without application of any substantial pressure. The heater and closer assembly is mounted on top of the machine console to the right of the top breaker and filler units 108, 109, as viewed in FIG. 1, and includes means for moving the carton continuously in a relatively long U-shaped path extending longitudinally of the console. The assembly 368 comprises main conveyor 110, a central support plate 369, a plurality of heaters 112a, 112b, 112c and 112d, and top closing unit 114 defined by fixed closing jaws 370, 371.

The top heaters 112a, 112b, 112c and 112d are mounted in cantilever fashion on the support plate 369 and extend into overlying relation with, and conform to the shape of, the path of the carton as it moves on main conveyor 110 (FIGS. 1 and 25). Referring more specifically to FIG. 26, the heater 112a is there illustrated in transverse section and is typical of the other straight heaters in the assembly 368. The heater 112a comprises an inverted trough reflector 372 which in this instance carries a plurality of electric resistance heating elements 374 situated therein on spacers 375 of porcelain or other appropriate material. The elements 374 are spaced with respect to each other and with the reflector 372 so as to drive into top closure panels 81a, 82a, 90, 91, 92 and 93 sufficient heat to cause adhesive activation of their thermoplastic coating. As noted earlier herein, in the case of cartons having polyethylene for such coating, these panels must be heated to approximately 350° to 500° Fahrenheit to produce adequate adhesive activation for sealing. In order to provide as much protection as possible for the machine operator and also to conserve the amount of heat used, the reflector 372 is provided with a jacket 376 leaving an air space therebetween.

The reflector and its heating elements are secured as by bolts 378 in depending relation from one or more cantilever brackets 379. Electric power is supplied via appropriate flexible conduit (not shown) to terminals (not shown) at the outer ends of the brackets 379 connected to the heating elements 374. Such terminals are suitably protected by a cover 380.

To permit access to the cartons on the conveyor 110 and also facilitate maintenance of the heaters, the cantilever brackets are connected to the support plate 369 by hinges 381 which swing on pins 382. The heater 112a may be swung from its horizontal or operating position, illustrated in FIG. 26, where it rests on an adjustable stop 384, to an upstanding or inoperative position where it is tilted back slightly over the support plate and rests against a fixed stop abutment 385.

The heater 112c (FIGS. 25, 27), while generally similar to the straight heater just described, is substantially semicircular in shape and mounted to overlie the curved portion of the carton path. The heater 112c is connected to the support plate by means of hinges 386, 388 and rests on adjustable stop 389. The heater 112c is adapted to be shifted pivotally on such hinges between an operative position illustrated in FIGS. 25 and 27 and a raised or inoperative position where it is simply tilted back toward the support plate until its hinges reach their limit of movement as defined by one or more stops 387.

With electrical resistance elements of the type described, the temperature at the element may be on the order of 1400° to 1600° F. With a procession of cartons in motion under these elements, this is sufficient to raise the temperature of their top closure panels satisfactorily to the 350° to 500° required for sealing. If, however, a machine stoppage should occur, the top closure panels and thermoplastic coating of the cartons in the conveyor 110 under the heaters may suffer severe thermal damage. Provision is made for obviating this danger by a mechanism which raises the heaters to a safe distance above the cartons automatically and as an incident to the stoppage of the machine. In this instance, such is accomplished as by means of pneumatic actuators 390, 391, having their plungers connected to the support plate 369. Upon stoppage of the machine, air pressure is automatically admitted to the actuators 390, 391 and the support plate 369, together with the heaters carried thereon, is immediately elevated to a safe position above the cartons. In addition to protecting the cartons, this arrangement also renders them accessible to the operation if it should become necessary to clear a jam on the conveyor.

Turning now to the top closer unit 114 per se, it will be noted upon reference to FIGS. 25 and 28 that the latter is mounted on a supporting column 392 on top of the console with its fixed jaws 370, 371 disposed in longitudinally aligned, overlying relation with the carton path. The jaws 370, 371 have tapered extensions at their leading ends (FIG. 28) which straddle the top of the carton 51 as it emerges from the last heater 112d. The jaws converge in the direction of movement of the carton on the conveyor 110, camming against the roof panels and top rib panels and ultimately bringing them together in a closing tunnel 394 of inverted Y-shape (FIG. 28). The tunnel 394 is proportioned so as to afford a relatively close sliding fit with the top closure members of the carton as it passes thereunder.

In order to preclude sticking and possible build-up of thermoplastic coating on the closing jaws 370, 371, they may be supplied with fluid coolant via suitable internal passages and inlet and outlet connections 395, 396 (FIGS. 25, 28).

*Rotary Top Sealer Unit*

The rotary top sealer unit 115 (FIGS. 1, 29, 30) is mounted on top of the machine console and situated substantially tangentially to the path of the carton as it emerges from the tunnel of the closer unit. The closed carton 51 is thereupon transferred from its associated receptacle of main conveyor 110 and onto fixed arcuate skids 398 concentric with the unit.

The top sealer unit 115 comprises a turret 399 journaled as by means of antifriction bearings 400 on a hollow, stationary shaft 401 anchored on the frame of the machine as by means of an adjustable timing sleeve 404 (FIG. 29). The turret 399 includes a plurality of moving carton sealing stations, in this instance four in number, adapted to apply sealing pressure to the carton top rib for the required time interval without interrupting the continuous movement of the carton through the machine. Each sealing station includes a carton pusher bracket 402 which is adapted to slide the carton along the support rails 398. Surrounding arcuate guide rails 402 prevent the carton from straying out of its proper path.

The turret 399 is driven in timed relation to the main drive of the machine as by means of a gear 405 integrally connected to the turret and located above the top of the machine console (FIGS. 4b and 29). The gear 405 is driven from pinion 406, the latter being fixed to spiral gear 362 which meshes with spiral gear 364 on main drive shaft extension 365.

For the purpose of applying sealing pressure to the carton top rib panels as an incident to rotation of the sealer turret 399, each carton station of the latter is equipped with a pair of movable pressure jaws 408 and 409 (FIGS. 29, 30). The jaw 408, which is adapted to contact the surface of the top rib facing the turret, is fixed to the projecting end of a radially disposed plunger 410. The latter is shifted on a radial axis defined by bearing sleeve 411 in timed relation with the rotation of the turret by reason of a fixed cam 412 having a sleeve 414 keyed as at 415 to stationary shaft 401. The cam 401 actuates a follower roller 416 carried by sleeve 418, which is actually a part of the plunger 410, to apply outward sealing pressure to the jaw 408.

In order to accommodate variations in carton top rib thickness which may occur from time to time, a moderate amount of resiliency may be introduced into either or both sealer jaws. In the present instance, only the jaw 408 is resiliently mounted. This is accomplished by means of a compression spring 419 interposed between the plunger sleeve 418 and head 420 of jaw 408. The compression of the spring 419, and the extent of the relative movement between the members 418, 420, may be determined by adjustable stop bolt 421 (FIG. 29). Members 418, 420 are retained radially and circumferentially in their bearing sleeve by means of key 422 secured to the turret housing.

Provision is made for applying a firm axial thrust against the exterior of the carton top closure following presentation of the closed carton to the top sealer so that the adhesively activated top closure panels will be maintained in proper position relative to one another as sealing pressure is applied. This is accomplished in the present case by forming the jaw 409 with a pressure face for engaging the outward face of the top rib, and a second pressure face substantially perpendicular to the first one for engaging the upper edge of the top rib before sealing pressure is applied by the jaws. In furtherance of such objective, the jaw 409 is mounted on an integral crank arm 424 adjustably fixed to the rock shaft 425 journaled in a hub 426 on the turret housing (FIGS. 29, 30). The inner end of the rock shaft 425 has a crank 427 thereon carrying a follower roller 428 at its outer end which runs in the track of a fixed cam 429. The latter is also keyed, as at 430, to the upstanding stationary shaft 401.

By reason of such arrangement, it will be perceived that the jaw 409 is adapted to be cammed down into engagement with the upper edge of the top rib and into cooperative registration with the complemental jaw 408, the latter action being facilitated as the second pressure face of the jaw 409 abuts solidly against the top of jaw 408. The jaw 408 is adapted to be cammed radially outward a short time later and to squeeze the carton top rib against the jaw 409 for sealing. The jaw 409 is backed up so as to withstand such pressure and in the present instance this is accomplished by means of a backup bar 431 rigidly fixed to the turret housing as by means of cap screws 432. The latter retain the bar 431 in longitudinal abutment with the outer face of the swinging jaw 409 when the latter is in sealing position.

Because the mass of the swinging jaw 409 is relatively smaller than that of the jaw 408 and its plunger 410, the jaw 409 may be fluid cooled. Coolant may conveniently be introduced via a central supply line 434 running longitudinally of the stationary support shaft 401 and withdrawn via a discharge conduit 435 also housed in the support shaft in spaced surrounding relation with the supply conduit. The turret 399 has a coolant supply chamber at the top 436 fed by line 434 and connected via a flexible line 438 to one of the swinging jaws 409, thence in series through the remaining jaws 409 and back via flexible return line 439 to a discharge chamber 440 also at the top of the turret. The latter communicates with discharge line 435.

Dater and Delivery Unit

The dater and delivery unit 441 (FIGS. 31–33) is mounted adjacent the rotary top sealer unit 115 and adapted to receive a procession of filled and sealed cartons presented by the latter. The unit 441 then passes each carton through a dater mechanism 442 where appropriate dating indicia are impressed on the upstanding top rib 80 and then discharges the carton to a conveyor, casing machine, or other receiving means (not shown).

In this instance, the dater and delivery unit comprises an upstanding transfer turret 444 having a series of circumferentially spaced carton pusher brackets 445 adapted to slide the carton on arcuate support rails 446 and between vertically spaced arcuate guide rails 448 for presentation to the dater mechanism 442. The latter includes a dating roll 449 and backup roll 450 both supported in depending relation from a boxlike housing 451 fixed to a suitable support 452 on top of the machine console and disposed in straddling relation with the path of the carton top rib. The backup roll 450 is journaled in the housing on a fixed axis, while the dating roll 449 is journaled on a laterally swingable arm 454 within the housing. The arm 454 has a spring-loaded link 455 connected to one end of it, yieldably urging the dating roll against the backup roll to facilitate marking of the carton top rib as it passes between the rolls.

The dating roll 449 may be of a wide variety of constructions. In the present case (FIG. 33), it comprises a dating ring 456 which carries thereon the printing indicia 458. The ring 456 may be quickly attached and detached for changing such indicia as by means of a suitable bayonet connection (not shown) between the ring and the body of the roll. When in place on the dating roll 449, the ring may be clamped as by means of collar 458 and cap screw 459.

The dater rolls 449, 450 and the transfer turret 444 are driven in timed relation with the other moving elements of the machine. This is accomplished by means of a chain and sprocket drive 460 coupled directly to main conveyor drive gears 362, 406 (FIGS. 4b, 32). The drive 460 is connected to the lower end of transfer turret shaft 461 and the latter, in turn, has a driving gear 462 at its upper end within the housing. The gear 462 drives the backup roll 464 through intermediate gears 465, 466 journaled in the housing (FIGS. 31, 32) meshing with gear 468 on backup roll shaft 469. The dating roll 449 is not power driven.

Secondary Machine Drive

In some instances, it may be necessary to include in the machine further protection against the adverse consequences of a stoppage, particularly in that section of the machine including the top heater and closer assembly and the top sealer. With a procession of cartons in process by these units and having their top closure parts heated and adhesively activated, it will be appreciated that a machine stoppage would interfere with proper closing and sealing of their tops, resulting in wastage of cartons and product.

Provision is made for eliminating wastage of cartons under the foregoing circumstances by splitting the main drive of the machine into a primary drive and a secondary drive. The two drives are normally coupled together and operate in unison. In event of a machine stoppage, however, the drives can be disconnected at the option of the operator, permitting the secondary drive to actuate the main conveyor 110 of the top heater and closer assembly 368, the rotary top sealer 115, and the dater and delivery unit 441, thereby completing satisfactorily the processing of the procession of cartons therein at the instant of machine stoppage.

In the illustrative machine 50, the drive may be split between main drive shaft 166 and its extension 365 (FIG. 4b). The latter may be driven via gears 362 and 364 by secondary drive motor 470 which normally operates in unison with main drive motor 164. Interposed between the extensions 365 and the shaft 166 is a clutch 471. The latter in this case may be coupled and uncoupled as by means of a shifter yoke 472 pivotally mounted in the machine frame and connected through arm 474, link 475, and fork 476 to the piston rod 478 of a pneumatic actuator 479 (FIG. 5). The actuator 479 may conveniently be controlled by the machine operator as by solenoid valve 480, to uncouple the clutch 471 and thereby permit direct operation of the secondary drive. Once the clutch 471 has been uncoupled, however, the secondary drive cannot be recoupled to the primary drive unless it is in proper phase with the primary drive as determined by the angular position of the shaft 166. This is accomplished as by means of a timing switch responsive to the angular position of the shaft 166 in relation to that of shaft extension 365. Once the drives have been uncoupled, the machine cannot be restarted until the drives have been recoupled. This is accomplished by means of an appropriate interlock switch 481 operated by the clutch actuator 479 and connected into the main drive control.

We claim as our invention:

1. A high-speed precision machine for forming cartons of paperboard or the like from blanks having a thermoplastic moistureproof coating on their inner and outer surfaces and score lines therein defining top and bottom closure panels, said machine comprising, in combination; a magazine adapted to hold a supply of said blanks; a mandrel assembly rotatably driven with a step-by-step indexing motion; means for feeding blanks successively from said magazine to said mandrel assembly and for erecting said blanks into open ended tubular form as an incident to such feeding; means defining a plurality of stations with which said mandrel assembly is adapted to register for successively breaking the folds of the bottom closure panels, heating the same for activating the thermoplastic coating thereon, and closing and sealing said bottom closure panels; a rotary top breaker unit; means for transferring said blanks successively as partially formed cartons from said mandrel assembly to said top breaker unit; a rotary filler unit adapted to receive cartons successively from said rotary top breaker unit, fill the same while in motion, and transfer them successively; a rotary steepler mechanism adapted to break said top closure panels further after filling of said cartons, means for heating the top closure panels of said cartons to adhesively activate the thermoplastic coating thereon; means for closing the adhesively activated top closure panels of said cartons; means for sealing the top closure panels of said cartons by the application of pressure thereto following adhesive activation; and delivery means for discharging the filled and sealed cartons from the machine.

2. A high-speed precision machine for forming cartons of paperboard or the like from blanks having a thermoplastic moistureproof coating on their inner and outer surfaces and score lines therein defining top and bottom closure panels, said machine comprising, in combination; a magazine adapted to hold a supply of said blanks; a mandrel assembly rotatably driven with a step-by-step indexing motion; means for feeding blanks successively from said magazine to said mandrel assembly and for erecting said blanks into open ended tubular form as an incident to such feeding; means defining bottom closure panel breaking, heating, closing and sealing stations with which said mandrel assembly is adapted to register; a rotary top breaker unit; means for transferring said blanks successively from said mandrel assembly to said top breaker unit; a rotary filler unit; a rotary top steepler mechanism; means for heating the top closure panels of said carton blanks to adhesively activate the thermoplastic coating thereon; a stationary top closure; a rotary top closure panel sealer; and a rotary delivery unit adapted to discharge the filled and sealed cartons from the machine.

3. A high-speed precision machine for forming cartons of paperboard or the like from blanks having a thermoplastic moistureproof coating on their inner and outer surfaces and score lines therein defining top and bottom closure panels, said machine comprising, in combination; a magazine adapted to hold a supply of said blanks; a mandrel assembly rotatably driven with a step-by-step indexing motion; means for feeding blanks successively from said magazine to said mandrel assembly and for erecting said blanks into open ended tubular form as an incident to such feeding; means defining a plurality of bottom closure panel breaking, heating, closing and sealing stations with which said mandrel assembly is adapted to register; a primary drive connected to said magazine, mandrel assembly, feeding means, and breaking, closing and sealing stations for operating the same; a rotary top breaker unit; means for transferring said blanks successively from said mandrel assembly to said top breaker unit; a filler unit; a top steepler mechanism adapted to break said top closure panels further after filling of said cartons; means for heating the top closure panels of said cartons to adhesively activate the thermoplastic coating thereon; means for closing said adhesively activated top closure panels; a main conveyor operatively associated with said top closure panel steepler, heater and closer means; a rotary top sealer unit; delivery means for discharging filled and sealed cartons from said machine; a secondary drive connected to said main conveyor, top steepler mechanism, top sealer unit and delivery means and normally coupled to said primary drive for operation in unison therewith; and means for uncoupling said drives for independent operation of said secondary drive in event of a stoppage of said primary drive.

4. In a high-speed carton forming machine for thermoplastic coated blanks of paperboard or the like having heat sealable top and bottom closure panels, each said blank having a body in erected form; the combination of a bottom forming mechanism; a primary drive connected to said bottom forming mechanism; a filler unit; means for heating, closing and sealing the top closure panels of the blanks after filling; means for discharging filled and sealed cartons from the machine; a secondary drive connected to said heating, closing, sealing and discharging means and normally coupled to said primary drive for operation in unison therewith; power means for said secondary drive; and means for uncoupling said drives for independent operation of said secondary drive in event of stoppage of said primary drive.

5. In a high-speed carton forming machine for thermoplastic coated blanks of paperboard or the like having heat sealable top and bottom closure panels; each said blank having a body in erected form; the combination of a bottom forming mechanism; a primary drive connected to said bottom forming mechanism; a filler unit; means for heating, closing and sealing the top closure panels of the blanks after filling; means for discharging filled and sealed cartons from the machine; a secondary drive connected to said heating, closing, sealing and discharging means and normally coupled to said primary drive for operation in unison therewith; power means for said secondary drive; means for uncoupling said drives for independent operation of said secondary drive in event of stoppage of said primary drive; and means for precluding restarting of said machine until said drives have been recoupled.

References Cited in the file of this patent
UNITED STATES PATENTS

| | | |
|---|---|---|
| 2,626,495 | Gaubert | Jan. 27, 1953 |
| 2,642,285 | Baker et al. | June 16, 1953 |
| 2,651,898 | Kimball | Sept. 15, 1953 |
| 2,699,712 | Meyer-Jagenberg et al. | Jan. 18, 1955 |
| 2,720,394 | Ferguson | Oct. 11, 1955 |
| 2,726,498 | Fischer et al. | Dec. 13, 1955 |
| 2,757,498 | Meyer-Jagenberg et al. | Aug. 7, 1956 |
| 2,844,927 | Warner | July 29, 1958 |
| 2,896,520 | Woelfer | July 28, 1959 |
| 2,901,076 | Dean | Aug. 25, 1959 |
| 2,957,289 | Monroe et al. | Oct. 25, 1960 |